(12) United States Patent
Soleyman et al.

(10) Patent No.: US 12,223,430 B1
(45) Date of Patent: Feb. 11, 2025

(54) EMPIRICAL GAME THEORETIC SYSTEM AND METHOD FOR ADVERSARIAL DECISION ANALYSIS

(71) Applicant: HRL Laboratories, LLC, Malibu, CA (US)

(72) Inventors: Sean Soleyman, Calabasas, CA (US); Deepak Khosla, Camarillo, CA (US); Fan H. Hung, Woodland Hills, CA (US); Samuel D. Johnson, Santa Monica, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 888 days.

(21) Appl. No.: 17/370,825

(22) Filed: Jul. 8, 2021

Related U.S. Application Data

(63) Continuation-in-part of application No. 17/167,001, filed on Feb. 3, 2021, now Pat. No. 12,061,673, which
(Continued)

(51) Int. Cl.
*G06N 3/086* (2023.01)
*G05B 13/02* (2006.01)
*G05B 13/04* (2006.01)

(52) U.S. Cl.
CPC ........... *G06N 3/086* (2013.01); *G05B 13/027* (2013.01); *G05B 13/04* (2013.01)

(58) Field of Classification Search
CPC ....... G06N 3/086; G05B 13/027; G05B 13/04
(Continued)

(56) References Cited

U.S. PATENT DOCUMENTS 6,473,851 B1 10/2002 Plutowski
7,849,033 B2 12/2010 Sabe et al.
(Continued)

OTHER PUBLICATIONS

Dritsoula et al., "A game-theoretic analysis of adversarial classification", IEEE Transactions on Information Forensics and Security, vol. 12, No. 12, Dec. 2017 (Year: 2017).*
(Continued)

*Primary Examiner* — Tsu-Chang Lee
(74) *Attorney, Agent, or Firm* — TOPE-MCKAY & ASSOCIATES

(57) ABSTRACT

Described is a system for performing a simulated vehicle control task based on adversarial decision analysis. Empirical game theoretic analyses are performed between an evolving and an adversary population of neural network strategies. Each empirical game theoretic analysis includes using a neuroevolution procedure to perform a fitness-based selection of a strategy in the evolving population that out-performs the adversary population. Using an empirical game theory procedure, the neuroevolution procedure is iteratively run and the selected strategy is added to the adversary population with each iteration, resulting in monotonic strategy improvement with each iteration. Following the empirical game theoretic analyses, a final strategy is selected for the evolving population and the adversary population using a tournament selection procedure. The final strategy is used to train a neural network which is used to perform a simulated vehicle control task.

22 Claims, 15 Drawing Sheets

Related U.S. Application Data is a continuation-in-part of application No. 17/064,566, filed on Oct. 6, 2020, which is a continuation-in-part of application No. 16/792,869, filed on Feb. 17, 2020.

(60) Provisional application No. 63/107,199, filed on Oct. 29, 2020, provisional application No. 63/027,829, filed on May 20, 2020, provisional application No. 62/953,008, filed on Dec. 23, 2019, provisional application No. 62/814,133, filed on Mar. 5, 2019.

(58) Field of Classification Search
USPC .......................................................... 706/25
See application file for complete search history.

(56) References Cited

U.S. PATENT DOCUMENTS

| | | | |
|---|---|---|---|
| 8,392,346 | B2 | 3/2013 | Ueda et al. |
| 9,530,412 | B2 | 12/2016 | Selfridge |
| 9,679,258 | B2 | 6/2017 | Mnih et al. |
| 11,210,585 | B1 | 12/2021 | Heess |
| 2018/0357552 | A1 | 12/2018 | Campos et al. |
| 2019/0171223 | A1* | 6/2019 | Liang ................... G06V 10/764 |
| 2019/0197244 | A1 | 6/2019 | Fong |
| 2019/0325597 | A1* | 10/2019 | Chakravarty ........ H04N 13/289 |
| 2020/0134461 | A1 | 4/2020 | Chai |
| 2021/0319362 | A1 | 10/2021 | Mguni |

OTHER PUBLICATIONS

Espeholt, L. et al. "IMPALA: Scalable Distributed Deep-RL with Importance Weighted Actor-Learner Architectures." arXiv:1802.01561, 2018, pp. 1-22.

Lanctot, M. et al. "A Unified Game-Theoretic Approach to Multiagent Reinforcement Learning." arXiv:1711.00832, 2017, pp. 1-27.

Vinyals, O. et al. "Grandmaster Level in StarCraft II Using Multi-Agent Reinforcement Learning." Nature, vol. 575, pp. 350-354, 2019.

Wright, M. et al. "Iterated Deep Reinforcement Learning in Games: History-Aware Training for Improved Stability." EC' 19: Proceedings of the 2019 ACM Conference on Economics and Computation, pp. 617-636, 2019.

Such, F.P. et al. "Deep Neuroevolution: Genetic Algorithms are a Competitive Alternative for Training Deep Neural Networks for Reinforcement Learning." arXiv: 1712.06567, 2018, pp. 1-16.

Russell, S. and Norvig, P. Artificial Intelligence: a Modern Approach, 3rd Edition, 2010, Chapter 4, p. 124.

Pieter Spronck, Marc Ponsen, Ida Sprinkhuizen-Kuyper, and Eric Postma (2006), in Adaptive Game AI with Dynamic Scripting. Machine Learning, vol. 63, No. 3, pp. 217-248, (Springer DOI: 10.1007/s10994-006-6205-6), http://www.spronck.net/publications.html.

Armon Toubman, Jan-Joris Roessingh, Pieter Spronck, Aske Plaat, and Jaap van den Herik (2014), in Dynamic Scripting with Team Coordination in Air Combat Simulation, Proceedings of the 27th International Conference on Industrial, Engineering & Other Applications of Applied Intelligent Systems, Springer-Verlag, (Presented at the IEAAIE 2014 conference), pp. 1-10.

Mnih et. al, "Asynchronous Methods for Deep Reinforcement Learning," Proceedings of The 33rd International Conference on Machine Learning, PMLR 48:1928-1937, 2016. Link: http://proceedings.mlr.press/v48/mniha16.html, pp. 1-10 and supplement pp. 1-10.

Proportional Navigation, found at https://en.wikipediaorg/wiki/Proportional_navigation, downloaded on Nov. 23, 2020.

The International Search Report of the International Searching Authority for PCT/US2020/054455; date of mailing Jul. 11, 2021.

The Written Opinion of the International Searching Authority for PCT/US2020/054455; date of mailing Jul. 11, 2021.

Pierre-Luc Bacon et al: "The Option-Critic Architecture," 2016, Proceedings of the Thirty-First AAAI Conference on Artificial Intelligence (AAAI-17), pp. 1726-1734.

Jean Harb et al: "When Waiting is not an Option : Learning Options with a Deliberation Cost," Arxiv.org. Cornell University Library. 201 Olin Library Cornell University Ithaca. NY 14853, Sep. 14, 2017, pp. 1-9.

Guillaume Lample et al: "Playing FPS Games with Deep Reinforcement Learning," Arxiv.org. Cornell University Library. 201 Olin Library Cornell University Ithaca. NY 14853. Sep. 18, 2016, pp. 2140-2146.

Sutton Richard S et al: "Between MOPs and semi-MOPs: a framework for temporal abstraction in reinforcement learning," Artificial Intelligence, vo 1 • 112. No. 1, Aug. 1, 1999 (Aug. 1, 1999), pp. 181-211.

Jain Deepali et al: "Hierarchical Reinforcement Leaming for Quadruped Locomotion," 2019 IEEE/RSJ International Conference on Intelligent Robots and Systems (IROS), IEEE. Nov. 3, 2019 (Nov. 3, 2019). pp. 7551-7557.

Ofir Nachum et al: "Data-Efficient Hierarchical Reinforcement Learning," 32nd Conference on Neural Information Processing Systems (NeunIPS 2018), Montréal, Canada, pp. 1-11.

Notification of and the International Preliminary Report on Patentability Chapter II for PCT/US2020/054455; date of mailing Feb. 28, 2022.

Pinto et al., Hierarchical Reinforcement Leaming with Monte Carlo Tree Search in Computer Fighting Game, in 11 (3) IEEE Transactions on Games, pp. 290-295 (2019).

Julian et al., Distributed Wildfire Surveillance with Autonomous Aircrali Using Deep Reinforcement Learning, in 42.8 J. Guidance, Control, and Dynamics, pp. 1768-1778 (2019).

Ramsredt et al., Real-Time Reinforcement Learning, in arXiv pre print arXiv: 1911.04448, pp. 1-16 (2019).

OpenAI Five. o pe nai. com/blog/openai-five/, Jun. 2018, downloaded Mar. 4, 2021, pp. 1-24.

AlphaStar: Mastering the Real-Time Strategy Game StarCraft II. deepmind.com/blog/article/ alphastar-mastering-real-time-strategy-game-starcraft-ii, Jan. 2019, downloaded Mar. 4, 2021, pp. 1-28.

Emergent Tool Use from Multi-Agent Interaction. openai. com/blog/emergent-tool-use/, Sep. 2019, downloaded Mar. 4, 2021, pp. 1-8.

M. Jaderberg, et al. Human-Level Performance in 3D Multiplayer Games with Population-Based Reinforcement Lea ning. Science, 364 (6443): pp. 859-865, 2015.

R. Lowe, et al. Multi-Agent Acto r-Critic for Mixed Co operative-Competitive Environment. arXiv:1706.02275v4, Mar. 2020, pp. 1-16.

J. N. Foerster, et al. Counterfactual Multi-Agent Policy Gradients. arXiv:1705.08926v2, Dec. 2017, pp. 1-10.

F. P. Such, et al. Deep Neuroevolution: Genetic Algorithms are a Competitive Alternative for Training Deep Neural Networks for Reinforcement Learning. arXiv:17 12.06567v3, Aug. 2018, pp. 1-16.

P. D. Clive, et al. Advanced Framework for Simulation, Integration and Modeling (AFSIM). Int'l Scientific Computing, pp. 73-77, 2015.

Notification of Transmittal, the International Search Report, and the Written Opinion of the International Searching Authority for PCT/US2020/018532; date of mailing Jun. 16, 2020.

Jederberg et al., "Human-level performance in first-person multiplayer games with population-based deep reinforcement learning." Arxiv, 2018, pp. 1-42.

K. Frans et. al. , "Meta Learning Shared Hierarchies." Arxiv, 2017, pp. 1-11.

Notification of the International Preliminary Report on Patentability Chapter II for PCT/US2020/01 8532; date of mailing Apr. 1, 2021.

The International Preliminary Report on Patentability Chapter II for PCT/US2020/018532; date of mailing Apr. 1, 2021.

D'Souza, M., et al. , "Avionics self-adaptive software : towards formal verification and validation," International Conference on Distributed Computing and Internet Technology, LNCS, vol. 11319, Springer, First Online: Dec. 11, 2018, pp. 3-23.

(56) References Cited

OTHER PUBLICATIONS

Latek, M., et al., "Strategic Interactions in irregular warfare an agent-based model," 2009, 12 pages.

Vidal, R., et al., "Pursuit-evasion games with unmanned ground and aerial vehicles," Proceedings 2001 ICRA, IEEE International Conference on Robotics and Automation (Cat. No. 01CH37 164), vol. 3, pp. 2948-2955.

Filippi, S., et al., "Oprimism in reinforcement learning and Kullback-Leibler divergence," 2010, 48th Annual Allerton Conference on Communication, Control, and Computing (Allerton), IEEE, 2010, pp. 115-122.

Office Action 1 for U.S. Appl. No. 16/792,869, Date mailed: Sep. 29, 2022.

Response to Office Action 1 for U.S. Appl. No. 16/792,869, Date mailed: Jan. 30, 2023.

\* cited by examiner

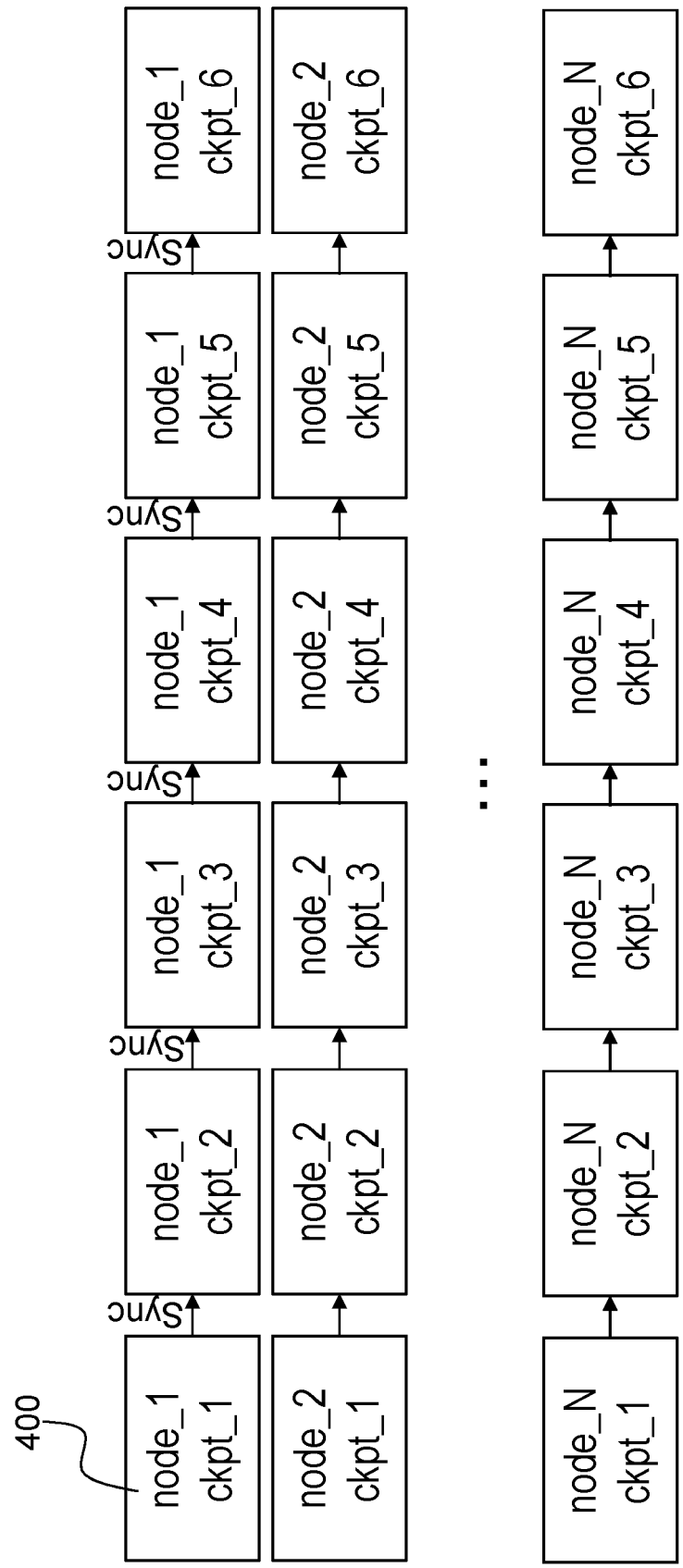

Training Run Parameters with Multi-Population EGT

| Parameter | Value | Notes |
|---|---|---|
| N_RUNS | 23 | 2 runs crashed due to server error, leaving 21 remaining |
| POPULATION_SIZE | 100 | |
| N_PARENTS | 20 | |
| MUTATION_SD | 0.1 | Gaussian noise added for mutation |
| MUTATION_RATE | 0.5 | Only mutate half of the individuals in the population |
| N_EPOCHS | 100 | |
| KEEP_CHECKPOINTS | 230 | Maximum size for adversarial_population (FIFO queue instead of array) |
| END_TRIALS | 30 | Perform a large number of trials to select best individual from each iteration |
| CHECKPOINT_TRIALS | 1000 | Perform additional trials to ensure iteration improves over adversarial_population |

FIG. 10

Results - Sample-Based Tournament

| run_id | nodes | averaged_score | win_rate vs. scripted |
|---|---|---|---|
| 1 | 36 | -480 | 9.8% |
| 2 | 37 | 903 | 91.2% |
| 3 | 38 | -477 | 40.3% |
| 4 | 39 | 648 | 89.9% |
| 5 | 40 | N/A (Server Error) | N/A (Server Error) |
| 6 | 41 | 333 | 29.2% |
| 7 | 42 | 600 | 89.4% |
| 8 | 43 | 900 | 88.0% |
| 9 | 44 | 939 | 89.5% |
| 10 | 45 | 876 | 84.9% |
| 11 | 46 | N/A (Server Error) | N/A (Server Error) |
| 12 | 47 | 792 | 89.2% |
| 13 | 48 | -981 | 23.2% |
| 14 | 49 | 201 | 78.2% |
| 15 | 50 | 216 | 79.2% |
| 16 | 51 | 414 | 88.6% |
| 17 | 52 | 189 | 25.9% |
| 18 | 53 | 51 | 22.8% |
| 19 | 54 | -141 | 21.3% |
| 20 | 55 | 102 | 18.7% |
| 21 | 56 | -438 | 30.9% |
| 22 | 57 | 450 | 88.8% |
| 23 | 58 | 483 | 86.9% |

FIG. 12

Results of the Generalizable Best Response Model and Various Others

| Opponent | Win | Loss | Draw |
|---|---|---|---|
| afsim_scripted_policy | 89.9% | 8.4% | 1.7% |
| randomized_policy | 25.4% | 3.3% | 71.3% |
| constant_pure_pursuit_and_shoot_policy | 96.9% | 2.7% | 0.4% |
| constant_no_op_policy | 35.4% | 0.0% | 64.6% |
| fire_plus_support_else_evade_else_pursuit | 94.3% | 5.2% | 0.5% |
| fire_plus_evade_else_pursuit | 82.5% | 15.5% | 2.0% |
| 2019-10-29-train_v_scripted_neuroevolution | 75.5% | 19.5% | 5.0% |

FIG. 14

EMPIRICAL GAME THEORETIC SYSTEM AND METHOD FOR ADVERSARIAL DECISION ANALYSIS

CROSS-REFERENCE TO RELATED APPLICATIONS

This is a Continuation-in-Part application of U.S. application Ser. No. 17/167,001, filed in the United States on Feb. 3, 2021, entitled, "Multi-Agent Planning and Autonomy," which is a Non-Provisional Application of U.S. Provisional Application No. 63/027,829, filed in the United States on May 20, 2020, entitled, "Multi-Agent Planning and Autonomy," the entirety of which is incorporated herein by reference. U.S. application Ser. No. 17/167,001 is also a Continuation-in-Part application of U.S. Ser. No. 17/064,566, filed in the United States on Oct. 6, 2020, entitled, "Autonomous Behavior Generation with Hierarchical Reinforcement Learning", which is a Continuation-in-Part application of U.S. application Ser. No. 16/792,869, filed in the United States on Feb. 17, 2020, which is a Non-Provisional application of U.S. Provisional Application No. 62/814,133, filed in the United States on Mar. 5, 2019, the entirety of which are incorporated herein by references. U.S. Ser. No. 17/064,566 is a Non-Provisional application of U.S. Provisional Application No. 62/953,008, filed in the United States on Dec. 23, 2019, the entirety of which is incorporated by reference.

This is also Non-Provisional Application of U.S. Provisional Application No. 63/107,199, filed in the United States on Oct. 29, 2020, entitled, "Empirical Game Theoretic System and Method for Adversarial Decision Analysis," the entirety of which is incorporated herein by reference.

GOVERNMENT LICENSE RIGHTS

This invention was made with government support under U.S. Government Contract Number HR0011-19-90018 awarded by DARPA program SI3-CMD. The government has certain rights in the invention.

BACKGROUND OF INVENTION

(1) Field of Invention

The present invention relates to a system for simulating and analyzing realistic adversarial behavior and, more particularly, to a system for simulating and analyzing realistic adversarial behavior for vehicle platform control using empirical game theoretic analyses.

(2) Description of Related Art

Game theory is the study of mathematical models of strategic interaction among rational decision makers. Neuroevolution, described in Literature Reference No. 5 (see the List of Incorporated Literature References), is a form of artificial intelligence (AI) that uses evolutionary algorithms to generate artificial neural networks (ANN), which consist of parameters, topology, and/or rules. Neuroevolution is commonly used in artificial intelligence, general game playing and evolutionary robotics. Additionally, neuroevolution is used as part of the reinforcement learning paradigm.

Another technique used in artificial intelligence is hill climbing. Hill climbing is an iterative algorithm that starts with an arbitrary solution to a problem, then attempts to find a better solution to the problem by making an incremental change to the solution. If the change produces a better solution, another incremental change is made to the new solution, which is repeated until no further improvements can be found. Random-restart hill climbing is a meta-algorithm which iteratively does hill-climbing, each time with a random initial condition. If a new run of hill climbing produces a better solution than the previously stored solution, then the new better solution replaces the stored state. The concept of random-restart hill climbing is well-known to the artificial intelligence community, but has not previously been used in conjunction with empirical game theoretic analysis. A description of the general concept can be found in Literature Reference No. 6.

Game theoretic analysis methods can be used to make decisions in adversarial environments where two human decision makers or autonomous systems have diametrically opposed objectives. Traditional game theoretic methods take a probabilistic model of the decision environment as input. However, empirical game theoretic analysis (EGTA) is different because it learns approximately optimal behavior by interacting with a simulation of the decision environment. This difference is of major importance in practical applications because real-world scenarios (such as military air-to-air engagements) can easily be simulated (e.g., using a commercially available flight simulator), but would give rise to intractably large probabilistic models. EGTA is a somewhat broad field, but the most relevant prior works are recent efforts by DeepMind Technologies Limited (located at 6 Pancras Square, London NIC 4AG, UK) that use policy gradient reinforcement learning algorithms, such as IMPALA (described in Literature Reference No. 1 of the List of Incorporated Literature References), as the best-response solver that learns a policy for defeating an opponent with a known, fixed strategy. DeepMind has recently published several papers in this area, the most directly relevant being Literature Reference No. 2. The authors used the technology to learn strategies for a computer game called StarCraft II, as described in Literature Reference No. 3. Other researchers have also used different reinforcement learning algorithms, such as Q-learning, to achieve similar results in simulated cybersecurity games, such as described in Literature Reference No. 4.

In the course of experimenting with the EGTA methods described above, it was unexpectedly observed that different EGTA runs produce results with vast diversity in quality, even if the only difference is that they each started with a different random initialization. Thus, a continuing need exists for a reliable technique that enables decision making in complex adversarial scenarios.

SUMMARY OF INVENTION

The present invention relates to a system for simulating and analyzing realistic adversarial behavior and, more particularly, to a system for simulating and analyzing realistic adversarial behavior for vehicle platform control using empirical game theoretic analyses. The system comprises one or more processors and a non-transitory computer-readable medium having executable instructions encoded thereon such that when executed, the one or more processors perform multiple operations. The system performs a plurality of empirical game theoretic analyses between an evolving population of neural network strategies and an adversary population of neural network strategies. Each empirical game theoretic analysis comprises using a neuroevolution procedure, performing a fitness-based selection of a strategy in the evolving population of neural network strategies that out-performs the adversary population of neural network strategies; and using an empirical game theory procedure, iteratively running the neuroevolution procedure and adding the selected strategy to the adversary population of neural network strategies with each iteration. Addition of the selected strategy to the adversary population of neural network strategies results in monotonic strategy improvement with each iteration. Following the plurality of empirical game theoretic analyses, a final strategy for the evolving population of neural network strategies and the adversary population of neural network strategies is selected using a tournament selection procedure. Using the final strategy, a neural network is trained. The trained neural network is used to perform a simulated vehicle control task.

In another aspect, the trained neural network is used to produce a simulated conflict scenario amongst vehicles, wherein the simulated conflict scenario is a graphical representation comprising a course of action for each vehicle of the conflict scenario.

In another aspect, the system controls maneuvering of one or more autonomous vehicles according to the simulated vehicle control task.

In another aspect, the system predicts a trajectory of each of the vehicles using both the final strategy for the evolving population of neural network strategies and the final strategy for the adversary population of neural network strategies.

In another aspect, the tournament selection procedure comprises evaluating each selected strategy from each iteration of the empirical game theory procedure against selected strategies from all other iterations; producing a fitness matrix from the evaluation; using a Nash solver to find a distribution for a symmetric zero-sum strategic form game defined by the fitness matrix; and outputting a mixed strategy comprising a set of strategies with a sampling distribution.

In another aspect, the tournament selection procedure comprises evaluating each selected strategy against a pre-existing adversary strategy to obtain a set of response quality metric results; and selecting the final strategy according to the set of response quality metric results.

In another aspect, the system evaluates the selected strategy from each iteration of the empirical game theory procedure against randomly sampled strategies from the adversary population of neural network strategies, and discards the selected strategy if it fails to result in improvement of the adversarial population of neural network strategies.

In another aspect, the evolving population of neural network strategies is re-initialized with random neural network weight parameters in each empirical game theoretic analysis.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 4 is an illustration of a multi-population EGT parallelism scheme according to some embodiments of the present disclosure;

FIG. 10 is a table of training run parameters with multi-population EGT according to some embodiments of the present disclosure;

FIG. 12 is a table of results for a sample-based tournament according to some embodiments of the present disclosure;

FIG. 14 is a table of results for a generalizable best response model and various others according to some embodiments of the present disclosure.

DETAILED DESCRIPTION

Figure 1:
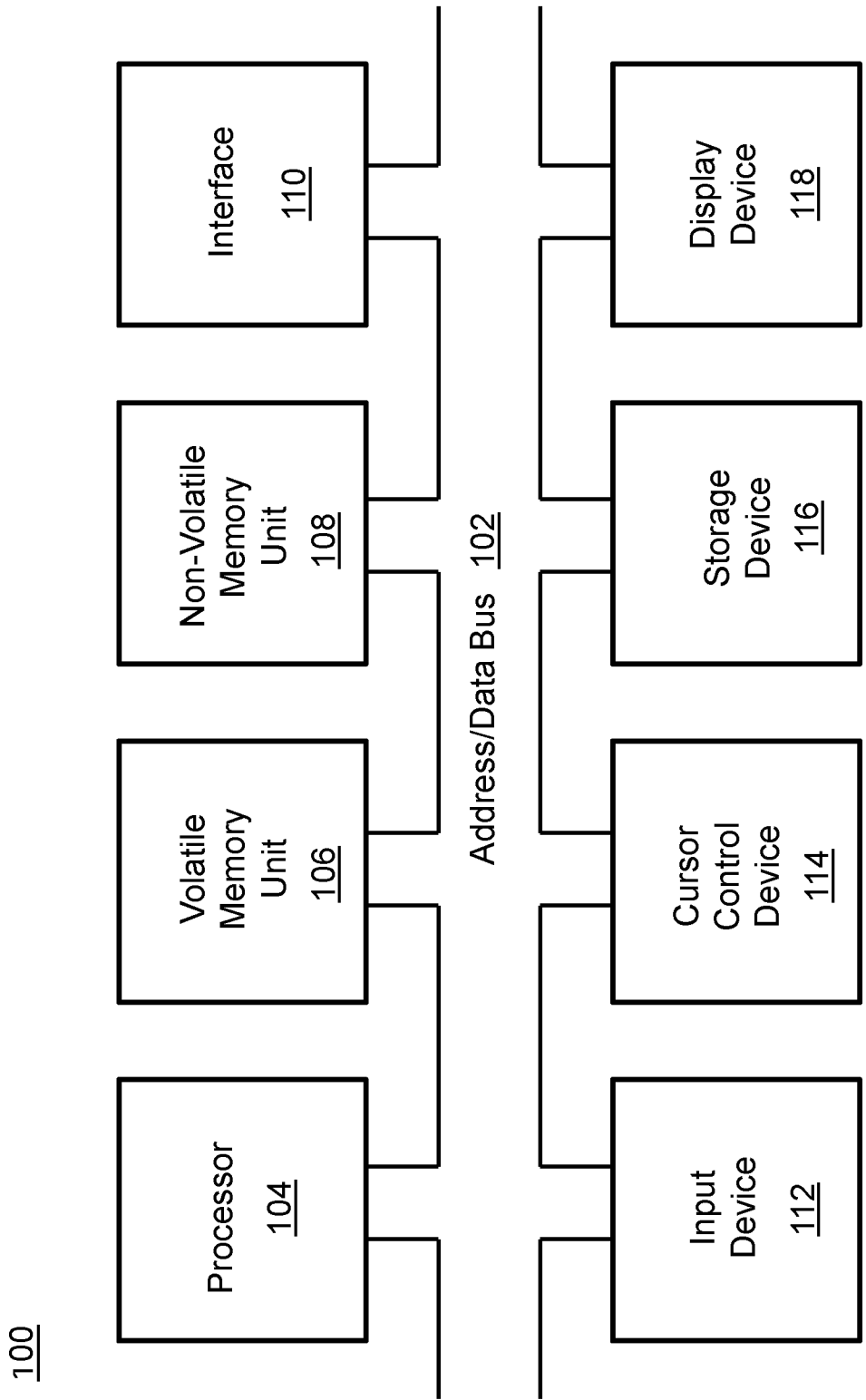
FIG. 1 is a block diagram depicting the components of a system for simulating and analyzing realistic adversarial behavior according to some embodiments of the present disclosure.

The present invention relates to a system for simulating and analyzing realistic adversarial behavior and, more particularly, to a system for simulating and analyzing realistic adversarial behavior for vehicle platform control using empirical game theoretic analyses. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Espeholt, L. et al. "IMPALA: Scalable Distributed Deep-RL with Importance Weighted Actor-Learner Architectures." arXiv:1802.01561.
2. Lanctot, M. et al. "A Unified Game-Theoretic Approach to Multiagent Reinforcement Learning." arXiv: 1711.00832.
3. Vinyals, O. et al. "Grandmaster Level in StarCraft II Using Multi-Agent Reinforcement Learning." Nature, vol. 575, 350-354, 2019.
4. Wright, M. et al. "Iterated Deep Reinforcement Learning in Games: History-Aware Training for Improved Stability." EC'19: Proceedings of the 2019 ACM Conference on Economics and Computation, 617-636, 2019.
5. Such, F. P. et al. "Deep Neuroevolution: Genetic Algorithms are a Competitive Alternative for Training Deep Neural Networks for Reinforcement Learning." arXiv: 1712.06567.
6. Russell, S. and Norvig, P. Artificial Intelligence: A Modern Approach, $3^{rd}$ Edition, Chapter 4, 124.

(2) PRINCIPAL ASPECTS

Various embodiments of the invention include three "principal" aspects. The first is a system for simulating and analyzing realistic adversarial behavior for vehicle platform control. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein. In various aspects, the computer system 100 can be embodied in any device(s) that operates to perform the functions as described herein as applicable to the particular application, such as a desktop computer, a mobile or smart phone, a tablet computer, a computer embodied in a mobile platform (e.g., one or more autonomous vehicles), or any other device or devices that can individually and/or collectively execute the instructions to perform the related operations/processes.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM ("EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
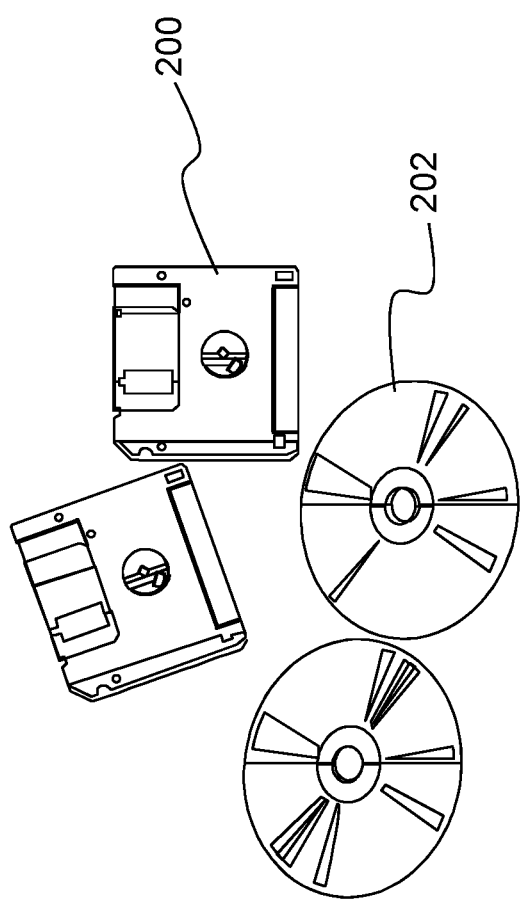
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF VARIOUS EMBODIMENTS

Described is a system and method for simulating and analyzing the behavior of two adversarial forces. The system learns from interaction with a simulated two-player adversarial environment such as an air engagement, and produces a control policy for each player or team. One such example of a simulated scenario models an air engagement between two teams (e.g., blue and red), each consisting of four aircraft and a base station. Each simulated aircraft is capable of performing the following behaviors: pursue, evade, weapon fire, weapon support, and straight flight. The simulation ends after a specified period of time (e.g., approximately 2400 time-steps, with each time-step representing ¼ second), and a numeric score is returned to indicate the outcome, where positive one (1) represents blue win, zero (0) represents draw, and negative one (−1) represents red win. The simulation includes the capability for a scripted artificial intelligence (AI) to control one or both of the teams, but the embodiment of the invention described herein does not have access to any pre-existing scripted AI during the training procedure. Instead, the invention learns realistic high-level strategies for both blue and red forces from scratch using an iterative procedure known as "self-play" or "empirical game theoretic analysis." Since this particular environment models a symmetric zero-sum game, it is possible for the same neural network model to control either the blue or red team. In game theory, a zero-sum game is a mathematical representation of a situation in which each participant's gain or loss of utility is exactly balanced by the losses or gains of the utility of the other participants. In other words, if the total gains of the participants are added up and the total losses are subtracted, they will sum to zero.

Figure 3A:
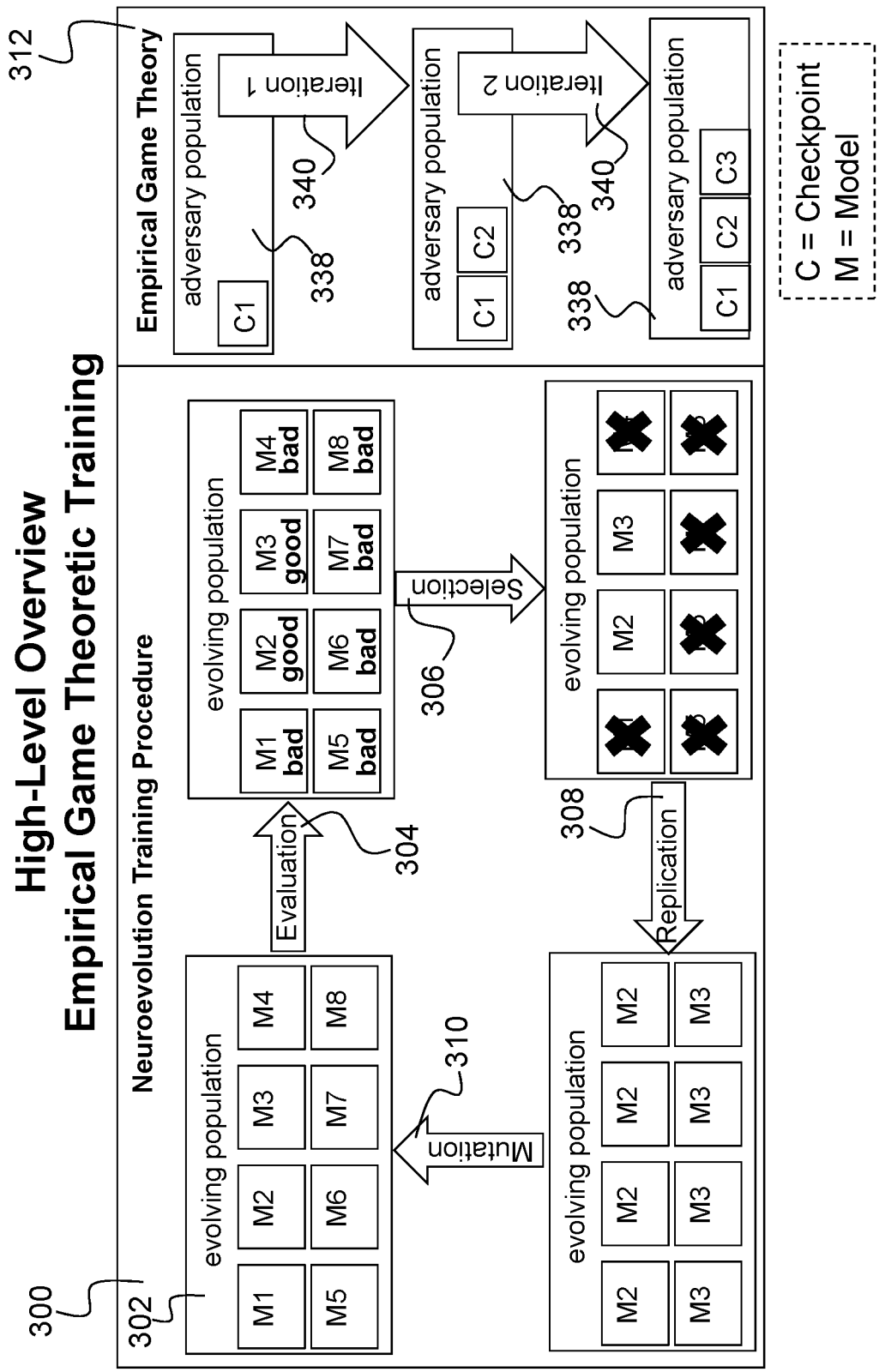
FIG. 3A is an illustration of the neuroevolution training procedure and empirical game theory components of empirical game theory training according to some embodiments of the present disclosure.
Figure 3B:
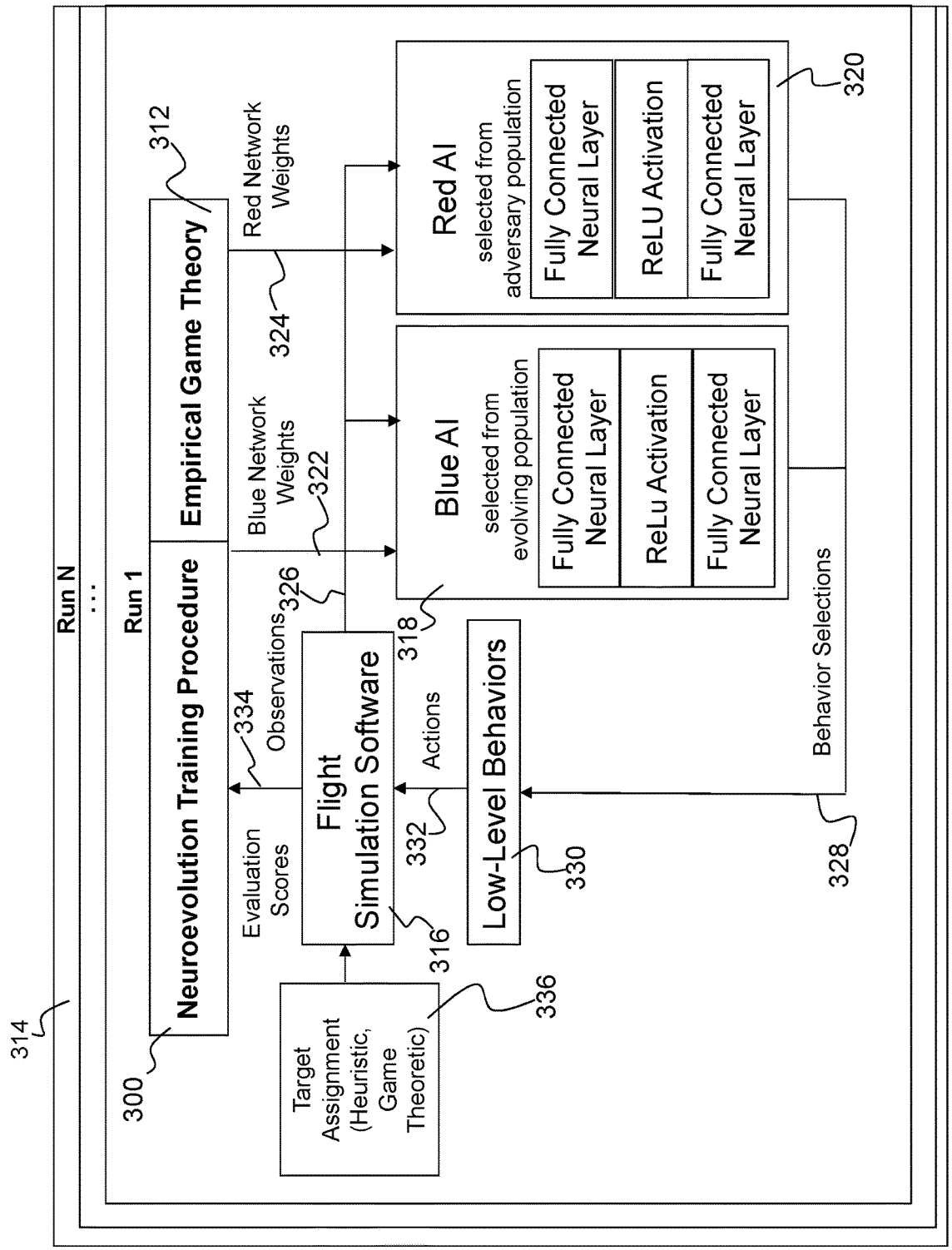
FIG. 3B is an illustration of the remaining components of empirical game theory (EGT) training according to some embodiments of the present disclosure.

FIGS. 3A and 3B depict a high-level overview of the first part of the invention described herein, which performs a multitude of emperical game theoretic training runs. The invention comprises three key components: (1) an inner loop, (2) a middle loop, and (3) an outer loop. As shown in FIG. 3A, the inner loop is shown in the neuroevolution training procedure 300 block, in which an evolving population 302 goes through evaluation 304, selection 306, replication 308, and mutation 310. The inner loop is a best response solver that uses neuroevolution and/or reinforcement learning to discover an effective strategy for defeating an opponent that is known to play a particular given strategy all the time. In game theory, the best response is the strategy (or strategies) that produces the most favorable outcome for a player, taking other players' strategies as a given. The best response is key to the Nash equilibrium, which is the point at which each player in a game has selected the best response (or one of the best responses) to the other players' strategies.

The middle loop is an empirical game theory 312 module that runs this best response solver multiple times in order to find better and better strategies after each iteration. FIG. 3A illustrates three iterations of the middle loop in the empirical game theory 312 block. One new checkpoint (or additional adversary) (e.g., C1, C2, C3) is accumulated for each iteration of the middle loop. One iteration of the middle loop comprises multiple epochs (e.g., approximately 100 epochs per iteration). The multiple epochs of neuroevolution training are performed by the inner loop. The outer loop (e.g., 314) runs several empirical game theoretic analyses (or runs), each with different random starting points and possibly with different hyperparameters (e.g., number of neurons) for neuroevolution and/or reinforcement learning. This is represented as "Run 1", " . . . ", and "Run N" in FIG. 3B.

The three loops are nested, such that each time the process goes through the outer loop (e.g., 314) (referred to as one "run"), the middle loop of the empirical game theory 312 module goes through multiple (e.g., thirty) iterations. Likewise, each time the middle loop goes through one iteration, the inner loop of the neuroevolution training procedure 300 block goes through approximately one-hundred epochs. The inner loop is the only loop that performs neuroevolution directly. The outer loop (e.g., 314) and middle loop of the empirical game theory 312 module perform neuroevolution indirectly when they run the inner loop. The middle loop performs an algorithm known as empirical game theoretic analysis (EGTA) described in Literature Reference No. 2.

In FIG. 3A, M1-M8 represents Models 1-8. The models are the individuals that constitute the evolving population. They represent eight different candidate neural networks that are each capable of controlling an entire team of actual vehicle platforms (e.g., aircraft), or simulated vehicle platforms. The general idea is to start out with a population of randomly initialized neural networks that specify mostly ineffective strategies for controlling the team of vehicle platforms. However, after several iterations of evolution, the output is a population where at least some of the individuals actually do specify effective strategies.

Following completion of the three loops (300, 312, and 314), a tournament selection procedure, which is depicted in FIGS. 6-9 and described in detail below. The tournament selection procedure is used to select the best strategy out of the several runs from the outer loop (e.g., 314). The outer loop is a unique aspect of the invention which runs several empirical game theoretic analyses. One would expect all of these runs to converge to similar results, but it turns out that certain specific runs exhibit exceptionally effective behavior, as shown in the table of results in FIG. 12 and described in detail below. An additional unique aspect lies in a number of tournament selection procedures that were developed in order to identify these exceptional runs. Additionally, the use of neuroevolution as the best response solver for empirical game theoretic analysis is unique.

At a high level, the unique training procedure described herein can be broken into two parts that operate in sequence. FIGS. 3A and 3B illustrate the first part of the procedure. As described above, one embodiment utilizes neuroevolution as the approximate best response solver, as illustrated in the box titled neuroevolution training procedure 300 in FIGS. 3A and 3B. The box titled empirical game theory 312 in FIGS. 3A and 3B illustrates the iterative procedure that enables one to learn from scratch without a pre-existing red adversary against which to train. "Blue" and "red" are commonly used in the military analysis community to refer to the two opposing sides of a conflict. They could also be referred to as "a first team" and "a second team." For the purpose of defining a concrete process, the AI from the evolving population is used to control the "blue" or "first" team, and the AI from the adversary population is used to control the "red" or "second" team.

FIG. 3B illustrates the system's interaction with the simulated environment (i.e., flight simulation software 316), which can be summarized as follows: First, sample a blue AI 318 and a red AI 320 from their respective populations (each individual in a population being described by a set of neural network weights (i.e., blue network weights 322 and red network weights 324). Then, reset the environment (i.e., flight simulation software 316), obtaining a set of current state observations 326 which are fed to the neural networks (i.e., blue AI 318 and red AI 320). Non-limiting examples of current state observations include relative position and velocity of the opponent with respect to ownship, position and velocity in other formats, and number of missiles.

The networks (i.e., blue AI 318 and red AI 320) perform behavior selection 328 to select low-level behaviors 330 that produce actions 332 which are passed to the environment (i.e., flight simulation software 316). Non-limiting examples of behaviors include "pursue opponent", "evade opponent", "fire weapon", "support weapon", and "fly straight". Actions are closely tied to corresponding behaviors. For example, if the AI selects the "fire weapon" behavior, this will initiate a sequence of actions that may consist of arming a missile, starting the missile engine, and releasing the missile. The "pursue opponent" behavior consists of adjusting the aircraft's ailerons, elevator, and rudder to turn towards the enemy aircraft.

This procedure involving the exchange of observations 326 and actions 332 between the environment (i.e., flight simulation software 316) and the agents (i.e., blue AI 318 and red AI 320) continues for several time-steps, until the episode ends in either a blue win, red win, or draw (timeout). Then, an evaluation score 334 is fed back to the neuroevolution training procedure 300, where it is used for fitness-based evolutionary selection. This entire process of performing a simulated episode from start (e.g., placement of aircraft) to end (e.g., one aircraft destroyed or run out of time) is performed a number of times (in many experiments, hundreds of thousands of times). This entire process comprises the "run a simulated episode" line in the pseudocode, which is inside the loops that get repeated several times.

In one embodiment, a task allocation algorithm is used to select the target assignments 336 (pairings between aircraft on different teams) and the learned AI controls the behavior of each resulting 1v1 matchup. This is why target assignment 336 is illustrated in a separate box, separate from the flight simulation software 316. Target assignment 336 can be performed simply by assigning each aircraft to target its nearest opponent, or using more advanced methods such as those described in U.S. application Ser. No. 17/167,001, which is hereby incorporated by reference as though fully set forth herein.

Although the invention according to embodiments of the present disclosure contains several unique components, it is significant that several runs of this entire procedure are performed either sequentially or in parallel. This is what enables the system to achieve reliably good results. The alternative is performing only a single run of empirical game theoretic analysis. One would expect that running the same procedure several times would yield similar results each time, but this turns out not to be the case. It turns out that any individual run has a high probability of failure-only around 10% to 50% of runs are successful. A successful run is one that produces near-optimal behavior. Optimal behavior is the selection of actions that maximize the fitness score (subject to the fact that a second AI is selecting actions with the competing objective of minimizing the first AI's fitness score). Near-optimality is potentially subjective, so for the sake of simplicity, a run is successful if it achieves more wins than losses (equivalently this means that the average fitness score is positive).

By performing a large number of runs, it is ensured that at least one will produce effective adversarial behaviors. Effectiveness is measured by the fitness score returned by the simulator. In the present invention, the simulator was programmed to provide a positive fitness score when the AI's controlled aircraft destroys its opponent, a negative fitness score when the AI's controlled aircraft is destroyed by the opponent, and zero fitness score if no aircraft is destroyed. In one embodiment, twenty-three such runs were performed in parallel on separate server nodes, with the expectation that a few may fail due to server errors. All of the runs were nearly identical, differing only in the random initialization of neural network starting population weights, or also in the number of hidden nodes (varied from 36 to 58 across the twenty-three runs), or possibly in other ways that are not of particular importance.

Below is the procedure depicted in FIGS. 3A and 3B in the form of pseudocode.

Constants:
POPULATION_SIZE is the number of sets of neural network weights in the evolving population
N_PARENTS is the number of sets of neural networks to keep after fitness selection
N_EPOCHS is the number of times to run the inner loop
N_ITERATIONS is the number of times to run the middle loop
N_RUNS is the number of times to run the outer loop (possibly in parallel)

Procedure:
initialize results_list as an empty list to contain sets of neural network weights for run_id in range (N_RUNS):
   initialize env_state with all parameters of the random environment (e.g., aircraft starting positions)
   initialize evolving_population as an array containing POPULATION_SIZE sets of neural network weights
   initialize fitness_scores as an array of floating point fitness scores (corresponding to evolving_population)
   initialize adversarial_population a list containing one set of neural network weights
   for iteration in range (N_ITERATIONS):
     for epoch in range (N_EPOCHS):
       for individual_id in range (POPULATION_SIZE)
         blue_model=evolving_population [individual_id]
         red model=uniform_random_sample (adversarial population)
         run a simulated episode with blue_model vs. red model
         blue_fitness=fitness score returned from the simulator
         fitness_scores [individual_id]=blue fitness
       end for
       select N_PARENTS models with highest corresponding fitness_scores from evolving_population
       replicate each of the surviving models until the number of models equals POPULATION_SIZE
       mutate some or all individuals in evolving_population
     end for
     append highest-fitness model from evolving_population to adversarial_population
     append highest-fitness model from evolving_population to results_list
   end for
end for
return results_list POPULATION_SIZE and N_PARENTS are the most important hyperparameters for the neuroevolution training procedure 300. Additional neuroevolution hyperparameters, such as MUTATION_RATE, are not shown in the pseudocode, but are described in more detail below. Alternatively, it is possible to use various other evolutionary algorithms, such as CMA-ES (Covariance Matrix Adaptation Evolution Strategy) or Augmented Random Search (ARS), or gradient-based reinforcement learning algorithms, such as Q learning, policy gradients, actor-critic, soft actor-critic (SAC), deep deterministic policy gradients (DDPG), twin-delayed DDPG (TD3), proximal policy optimization (PPO), or trust region policy optimization (TRPO) in place of neuroevolution. N_ITERATIONS controls how many iterations of empirical game theoretic analysis 312 are to be performed (e.g., 30 in one embodiment, although more would potentially result in convergence to a superior result). N_RUNS is used to select the number of random starts.

As described above, the procedure consists of three nested loops. The outer-most loop performs N_RUNS (e.g., 314) separate runs, each with a different random start. The multiple iterations of this loop run in parallel in the embodiment described herein. Each run starts out with the initialization of an environment (e.g., flight simulation software 316), or possibly multiple instances in parallel to speed up evaluation, as described U.S. application Ser. No. 17/167, 001). Each run also has an evolving population 302 (evolving_population), which will be used for the neuroevolution training procedure 300, an array of fitness scores (fitness_scores) corresponding to each individual in this population, and a separate adversarial population (adversarial population) that starts out with just a single randomly-initialized set of network weights. The evolving population keeps getting modified after each epoch. Only after a number of epochs have passed (typically around 50 to 200 epochs), a new adversary is added to the adversary population 338. In the pseudocode, the loop that modifies the evolving population 302 is inside the loop that modifies the adversary population 338. The code in the inner loop gets executed several times for each iteration of the outer loop. These nested loops are analogous to the minute hand and hour hand of a clock.

As shown in FIG. 3A, one or more individuals/adversaries (checkpoints (e.g., C1, C2, C3) will be added to the adversarial population 338 after each iteration 340 of empirical game theoretic analysis 312. The adversarial and evolving populations 338 and 302 are each implemented as a list data structure that can contain multiple sets of neural network weights (the neural network weights are the part of the AI where learning takes place). Therefore, references to "individuals" are "sets of neural network weights." This is the purpose of the middle loop, which performs this iterative empirical game theoretic analysis 312 procedure. Each iteration 340 trains a best response model against opponents that are sampled from the existing adversarial population 338. Assuming that the best response solver in the neuroevolution training procedure 300 succeeds in finding a neural network policy that out-performs the existing population, addition of this policy to the population results in monotonic policy improvement from one iteration to the next. Although the adversarial population 338 is initialized with a single random policy that is expected to behave randomly, subsequent iterations produce more and more intelligent adversarial strategies.

One innovation of the present invention is that it allows one to achieve monotonic policy improvement as long as the approximate best response solver succeeds with probability substantially greater than zero. At the end of each iteration, the final model that is about to be added to the adversarial population 338 is tested against opponents sampled from the pre-existing adversarial population 338 for a pre-specified number of episodes (e.g., 1000). If the resulting mean fitness is less than zero (in a symmetric zero-sum game), the model is discarded. Additionally, the evolving population is re-initialized with new sets of randomized network weights whenever the mean fitness is less than zero.

Figure 5:
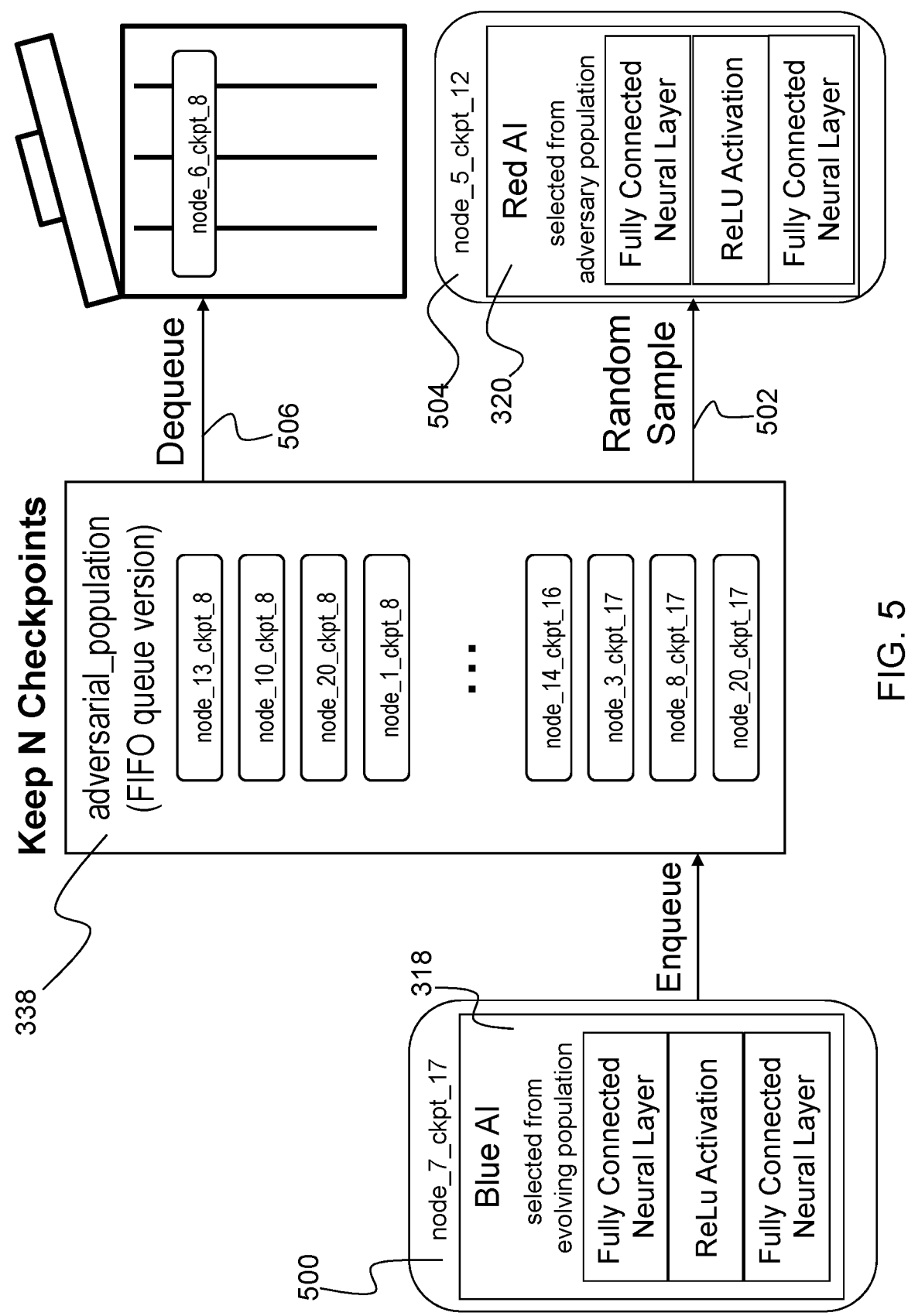
FIG. 5 is an illustration of a FIFO (First In, First Out) queue used in place of an array in order to limit the size of the adversarial population according to some embodiments of the present disclosure.

The inner-most loop performs neuroevolution as part of the neuroevolution training procedure 300. This procedure runs for a number of epochs (e.g., 100 epochs per iteration). Each epoch corresponds intuitively to one generation of biologically-inspired evolution, in an idealized world where the key steps of evaluation 304, selection 306, replication 308, and mutation 310 are performed sequentially on the entire population, as depicted in FIG. 3A. First, as shown in FIG. 5, evaluate each individual 500 (i.e., set of neural network weights) in the evolving population 302 against a randomly-sampled 502 individual 504 from the adversarial population 338. Various sampling methods may be employed. In one embodiment, a uniform random distribution was used to ensure that all individuals from the adversarial population 338 are selected with nonzero frequency. This approach is known in the game theory literature as "self-play." Experiments were also performed with a more elaborate approach, where all of the individuals in the adversarial population 338 are evaluated against one another, and the resulting utility matrix is used to compute a Nash distribution for the resulting strategic-form game. The results of this approach were found to be similar in quality to those of the simpler uniform random approach.

Once each individual 500 in the evolving population 302 has been evaluated and the resulting fitness stored in fitness scores (fitness_scores), one can perform fitness-based selection 306. In one embodiment, twenty of the individuals with the highest fitness scores were selected. Several other methods described in existing neuroevolution literature could also be utilized, such as roulette wheel selection or threshold selection. Next, the selected parents are replicated (i.e., replication 308) so as to preserve the population size. In one embodiment, one hundred new individuals were sampled from a population of twenty parents; however, each parent could also be copied (i.e., replicated) five times to achieve similar results.

Finally, the population is mutated (i.e., mutation 310) by adding random noise to the parameter vector of each individual. The special mutation operator described in U.S. application Ser. No. 17/167,001 was utilized. As described in that disclosure, only half of the individuals in the population are mutated, and the maximum mutation standard deviation is 0.1. Then, the neuroevolution training procedure 300 is repeated.

The invention also comprises an innovative "multi-population" approach that shares the same adversarial population across all runs. This feature is considered to be a component of the embodiment described herein, since it seems to result in better, more consistent results (described below). For this approach to work, it is essential that all iterations of the outer-most loop (e.g., 314) run in parallel. FIG. 4 depicts the multi-population EGT parallelism scheme, where each node (e.g., 400) represents a server, and there are N servers in total. In order to achieve additional speedup, each run is performed on a separate machine, with all of the machines having access to a shared network-attached disk. At the end of each iteration, each run's process saves the resulting model to disk and then waits until all of the other runs have also completed. At such time, each process loads the new models from all of the runs and appends them all to the adversarial population 338.

Only minor code changes are required to implement this synchronization step, as shown in the modified pseudocode below for multi-population adversarial learning with synchronization between runs.

Constants:
    POPULATION_SIZE is the number of sets of neural network weights in the evolving population
    N_PARENTS is the number of sets of neural networks to keep after fitness selection
    N_EPOCHS is the number of times to run the inner loop
    N_ITERATIONS is the number of times to run the middle loop
    N_RUNS is the number of times to run the outer loop (all iterations run in parallel, separate processes)

Procedure:
    initialize results_list as an empty list to contain sets of neural network weights for run_id in range (N_RUNS):
        initialize env_state with all parameters of the random environment (e.g., aircraft starting positions)
        initialize evolving population as an array containing POPULATION_SIZE sets of neural network weights
        initialize fitness_scores as an array of floating point fitness scores (corresponding to evolving_population)
        initialize adversarial_population as a list containing one set of neural network weights
        for iteration in range (N_ITERATIONS):
            for epoch in range (N_EPOCHS):
                for individual_id in range (POPULATION_SIZE)
                    blue model=evolving_population [individual_id]
                    red model=uniform_random_sample (adversarial_population)
                    run a simulated episode with blue_model vs. red_model
                    blue_fitness=fitness score returned from the simulator
                    fitness_scores [individual_id]=blue_fitness
                end for
                select N_PARENTS models with highest corresponding fitness_scores from evolving_population
                replicate each of the surviving models until the number of models equals POPULATION_SIZE
                mutate some or all individuals in evolving_population

```
    end for
    save highest-fitness model from evolving_population
        to disk, filename node_$run_id/ckpt_$iteration
        append highest-fitness model from evolving_popu-
            lation to results_list for run_id in range
            (N_RUNS)
            wait until node_$run_id/ckpt_$iteration has been
                saved load node_$run_id/ckpt_$iteration and
                append it to adversarial_population
        end for
    end for
end for
return results_list
```

The key difference in this pseudocode (highlighted in bold text above) is that instead of simply adding the best model to the adversarial population at the end of each iteration, it is saved to a disk. Then, wait until all of the other processes have also saved to the disk before proceeding with synchronization of the adversarial populations.

When running many (e.g., 23) parallel processes on separate server nodes for several days, it is likely that some sort of communication or hardware error will disrupt one or more of the runs. Therefore, a simple error recovery system is implemented that permits the other runs to continue if there is no other way to fix the problem. This objective is accomplished by adding a check to the loop that loads all of the models. If the operator creates an empty directory where the model for a failed run should be saved, the other runs will proceed without loading the missing model. It would also be possible to implement a more automated time-out that causes the other runs to continue if the model is still missing after a certain pre-set number of hours (e.g., 10 hours).

The addition of adversaries from multiple iterations of multiple runs can quickly result in a very large adversarial population 338. Therefore, an additional innovation was developed, as illustrated in FIG. 5, that limits the size of the adversarial population 338 by using a FIFO (First In, First Out) queue to discard (or dequeue 506) the oldest individuals. This queue also permits random access of the elements that have not yet been discarded to facilitate the population sampling functionality that was described above. Intuitively, it makes sense to limit the size of the adversarial population 338 because the oldest models most likely exhibit poor performance relative to the newer models. Elimination of the old models, therefore, enables faster convergence, in addition to saving memory. In a non-limiting example with 23 runs and 30 iterations per run, the maximum queue size was set to 230 so as to cycle fresh models through the queue approximately three times. Once all of the runs have completed, a results list (results_list) containing several trained models is returned. In the described embodiment, only the model from the last iteration of each run is kept. Alternatively, the model from each iteration of each run can be kept. In either case, there are now a plurality of candidate policies.

Figure 6:
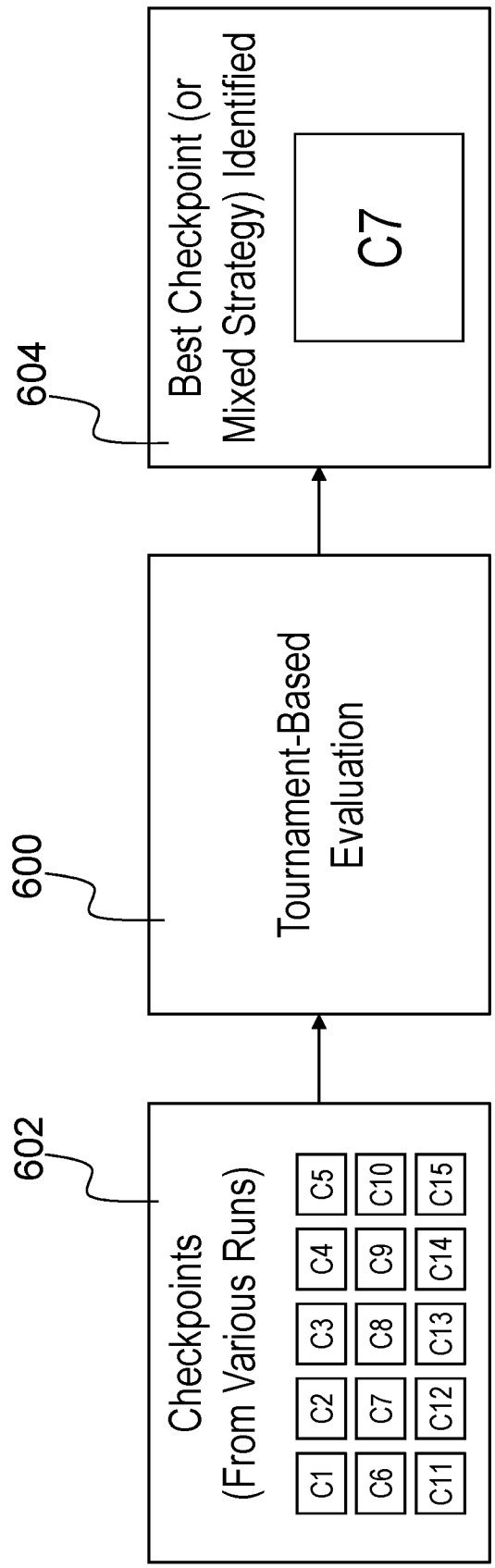
FIG. 6 is an illustration of a high-level overview of tournament-based evaluation according to some embodiments of the present disclosure.

In the following, tournament-based methods for selecting one of these models, or a policy for sampling a mixed strategy from this set of models is described. A high-level overview of this tournament-based approach is illustrated in FIG. 6. A sequence of evaluations (i.e., tournament-based evaluation 600) is performed involving all of the checkpoints 602 from various runs. This provides the information needed to select a final best checkpoint 604, or fully trained neural network, which is an output of the invention.

In one aspect, the trained neural network (or final best checkpoint 604) is used to control a team of fully autonomous aircraft directly. Provided that the neural network was trained using a high-fidelity simulator that provides the same sensor inputs to the network as the real aircraft and correctly models the real aircraft's response to the network's control outputs, the same network that was trained in simulation can be utilized to control real aircraft effectively. In this example, the present invention takes, as input, sensor data and outputs control signals that are sent either directly to aircraft actuators, or to low-level controllers that interface with the actuators. Following simulation of various vehicle control maneuvers (e.g., brake, turn, swerve, decelerate, accelerate) via the trained neural network, the invention described herein can cause/control maneuvering of one or more autonomous vehicles according to the simulated vehicle control task.

Autonomous control of a vehicle requires real-time feedback. For example, when faced with another oncoming vehicle, a vehicle (e.g., car) may need to turn right or left immediately. The vehicle does not have time to run a full set of game-theoretic analyses to determine a best strategy. Thus, once the neural network has been trained as described above, the vehicle can respond to feedback in real time because the vehicle sensors are provides an input to the trained neural network. Additionally, once the neural network has been trained, it can be duplicated in large numbers and installed in all units of a given model of vehicle.

In another aspect, the trained neural network (or final best checkpoint 604) is used to produce a realistic simulation of how a mission will play out, including the most effective course of action for each side of the conflict. Military analysts spend a lot of time creating simulated missions that contain various aircraft, ground units, etc. For the simulation to be useful, the analyst must specify realistic behaviors for all of these units. Once the analyst specifies the physical capabilities of all military assets in the simulation, the artificial intelligence (AI) can be trained with very limited human effort and can then be used to produce a realistic simulation of how the mission will play out, including the most effective course of action for each side of the conflict. Specifically, the invention described herein can receive, as input, models of all the military assets in each side of a conflict and output the most appropriate step-by-step course of action for each of the two sides, together with a video or tabular/graphical representation of how the scenario will play out.

Several tournament-based methods were explored. The first method, which is considered to be a component of the preferred embodiment, actually re-purposes one of the innovations described above, where at the end of each iteration, the resulting best response agent is evaluated against randomly sampled opponents from the adversarial population many (e.g., 1000) times. At the end of the training procedure, the model with the highest fitness score achieved against the randomly sampled set of opponents is selected. This approach works very well in practice, as supported by results that will be described below in FIG. 12. The disadvantages of this approach are three-fold. First, it only works in conjunction with the multi-population synchronized approach, because it is necessary to evaluate the model against an adversarial population consisting of diverse models from all of the runs. Also, the approach is biased towards models that are produced earlier during training, when the adversarial population consists of less effective policies. Finally, if each neural network model specifies a fixed (deterministic) strategy, it is not possible to find a mixed (stochastic) strategy using this approach.

Figure 7:
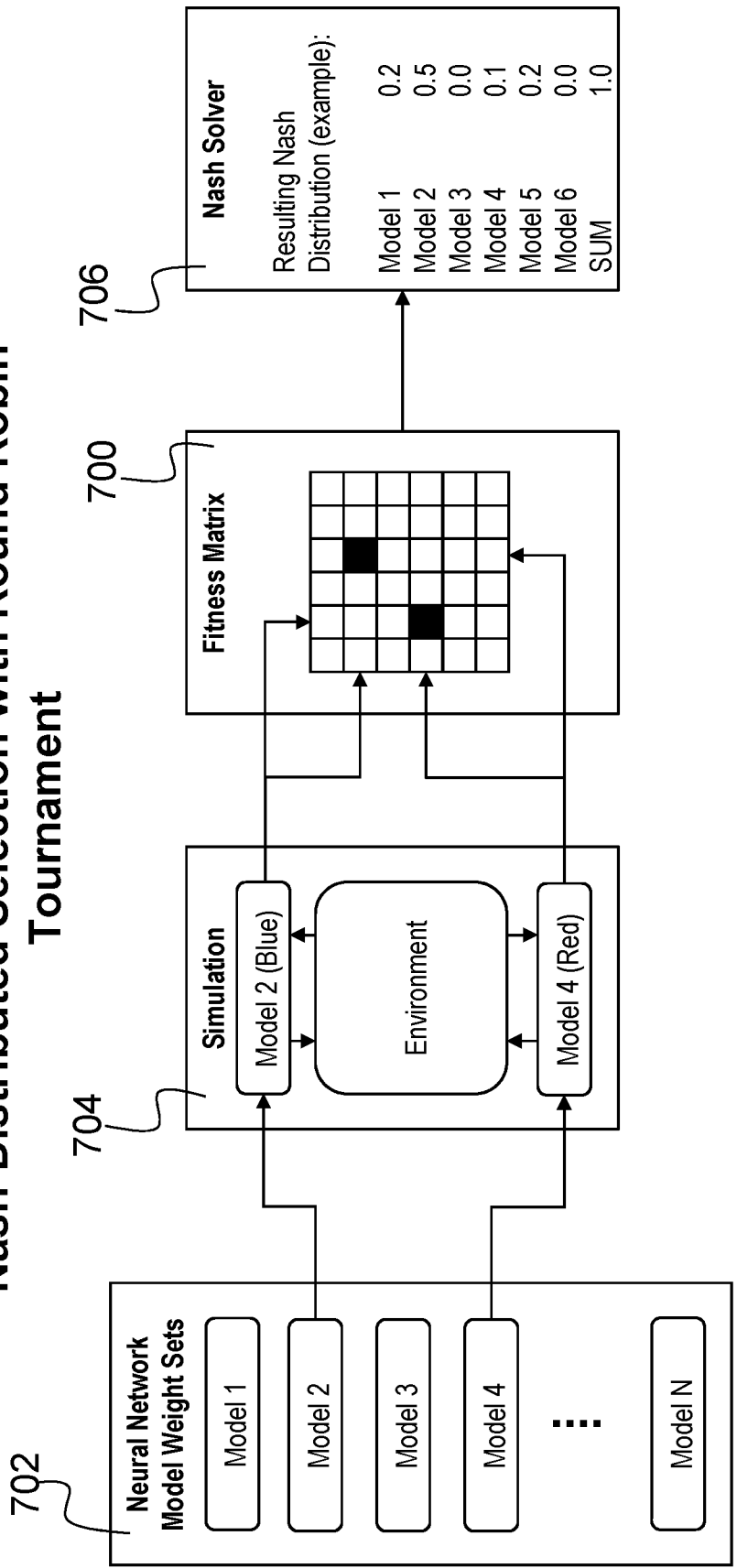
FIG. 7 is an illustration of a Nash-distributed selection with round robin tournament according to some embodiments of the present disclosure.

The next (alternative) method, illustrated in FIG. 7, consists of two steps. First, a round-robin tournament produces a fitness matrix 700 by performing a fixed number of evaluation runs between each pair of models in the neural network model weight sets 702 in a simulation 704. Each entry of the fitness matrix 700 represents the number of wins for the row-player minus the number of wins for the column-player. In the case of a symmetric zero-sum game, the fitness matrix 700 should be approximately antisymmetric. Any symmetric component must be due to stochastic effects, so it is possible to speed up production of this matrix by setting all of the diagonal elements to zero and computing only the lower-triangle, then adding the negative transpose. Once the fitness matrix 700 has been prepared, a Nash solver 706 can be used to solve the symmetric zero-sum strategic form game defined by the fitness matrix 700. The result can be interpreted as a probability distribution indicating the frequencies at which each model from the population should be sampled in order to achieve game-theoretically optimal play, assuming that the optimal strategy can be formed by a mixture of the individuals in the population. Therefore, in this case, the output of the system is not a single neural network policy, but a population of policies accompanied by a distribution that will be used to sample them during actual end use. Sampling of multiple neural network policies is relevant to autonomous control of mobile platforms. The benefit of randomly sampling a policy from a set as opposed to selecting a single one every time can be observed in the game of "rock paper scissors." If a player selects any one of the three options every time, this predicable behavior will soon lead to consistent defeat. The optimal solution in "rock paper scissors" is to select one of the three randomly each time.

The advantage is that this method can be used to approximate a mixed strategy Nash equilibrium even when the underlying policies are deterministic (as is the case for neural network policies that are developed using neuroevolution). Non-limiting examples of Nash solvers 706 include lrsnash and 2nash which compute all Nash equilibria of a two person non-cooperative game. 2nash is a two-processor parallel version. lrsnash and 2nash can be found at cgm.cs.mcgill.ca/~avis/C/lrs.html. In a Nash equilibrium, each player is assumed to know the equilibrium strategies of the other players and no player has anything to gain by changing only their own strategy. The key disadvantage is the $O(N^2)$ asymptotic performance, where N represents the number of individuals in the population. $O(N^2)$ is standard notation from algorithmic analysis, which means that the program run time is approximately proportional to the square of the number of sets of neural network weights in the population. For example, if the population has 10 times as many such sets, it will take 100 times as long to run. In practice, this tends to result in prohibitive slowdown when the number of iterations gets to around 30. In the experiments that do utilize this method, the number of episodes for each round-robin matchup was typically set to 100 or 1000. One final disadvantage is that in many cases, the Nash solver 706 simply finds that all of the models should be sampled uniformly, which does not appear to be optimal in practice.

Figure 8:
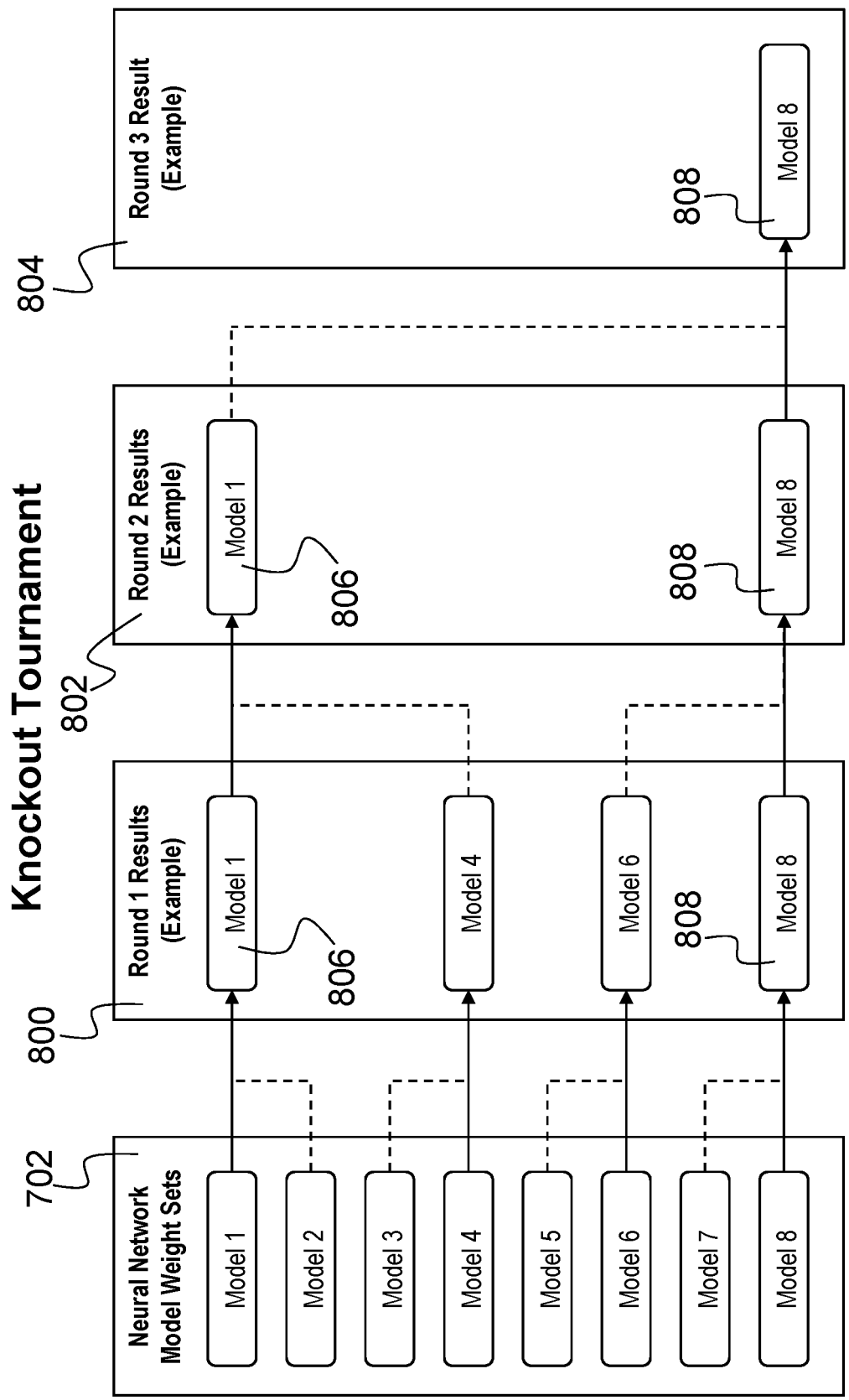
FIG. 8 is an illustration of a knockout tournament according to some embodiments of the present disclosure.

FIG. 8 illustrates a knockout tournament as yet another alternate embodiment. Here, a series of elimination rounds 800, 802, and 804 is performed, where only some of the models in the neural network model weight sets 702 are played against each other during each round. The salient advantage of this method is its superior O(N log N) performance as the number of models to be evaluated is increased asymptotically. O(N log N) means that the run time is approximately proportional to N times the natural logarithm of N. For example, if the population size is increased from 10 to 100, the run time will increase by a factor of around 20. This is a clear advantage over previous approaches when the population size is large. Unfortunately, the model selected by this method tends to exhibit inferior qualitative adversarial behavior as compared to the preferred embodiment described above. However, this method could be useful as a first pass for narrowing down the pool of likely candidates.

Figure 9:
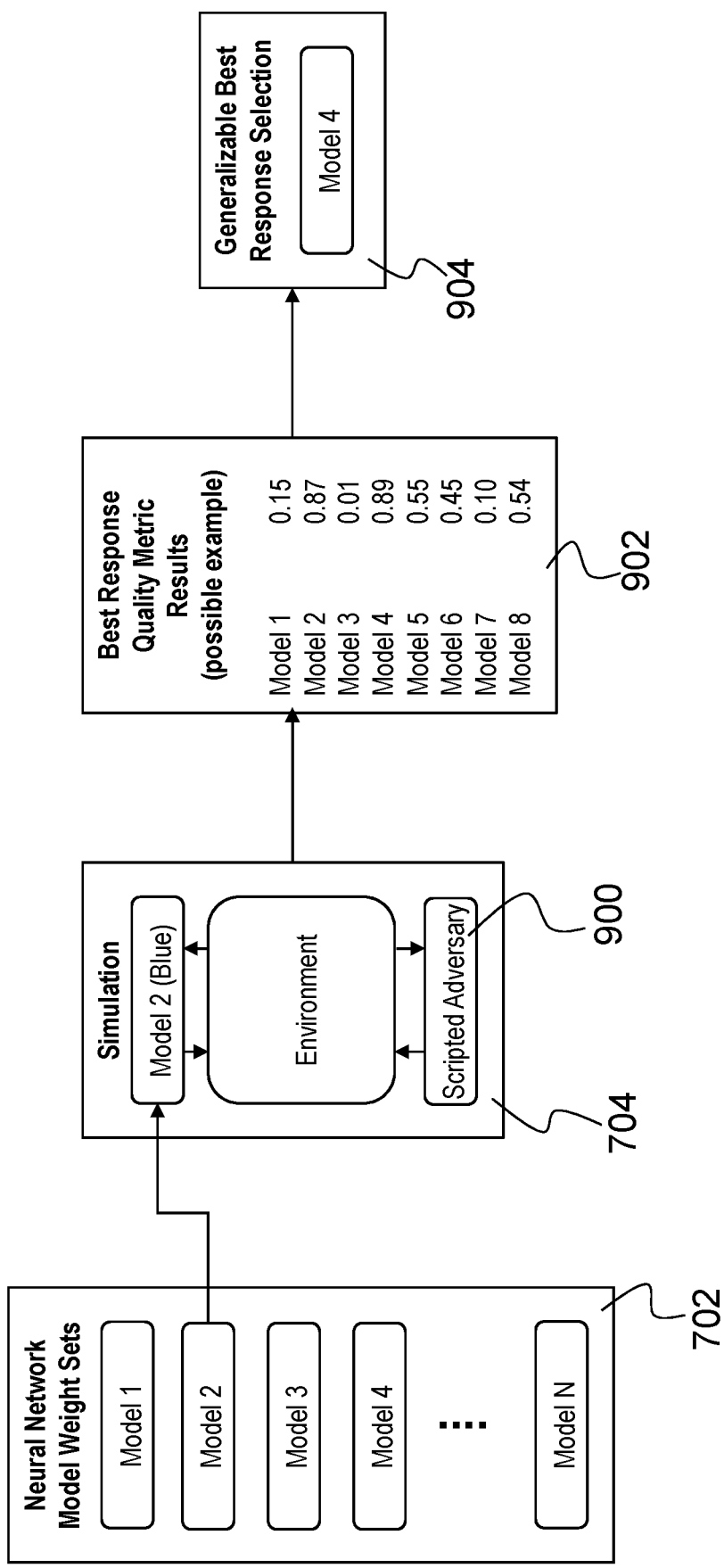
FIG. 9 is an illustration of a generalizable best response selection according to some embodiments of the present disclosure.

FIG. 9 depicts another alternative embodiment for tournament selection where instead of evaluating the models against other results of empirical game theoretic analysis, the models are evaluated against a pre-existing opponent strategy (i.e., scripted adversary 900) during simulation 704 to obtain a set of best response quality metric results 902, and finally a "generalizable best response selection" 904. As described later in terms of quantitative results, this approach yields a solution that performs very well against the particular opponent strategy (i.e., best response), but also achieves satisfactory performance against a wide variety of other opponent strategies (i.e., generalizable). The generalizable best response model also performs well against various other scripted policies, with more wins than losses in each and every case, as shown in FIG. 14.

Figure 11:
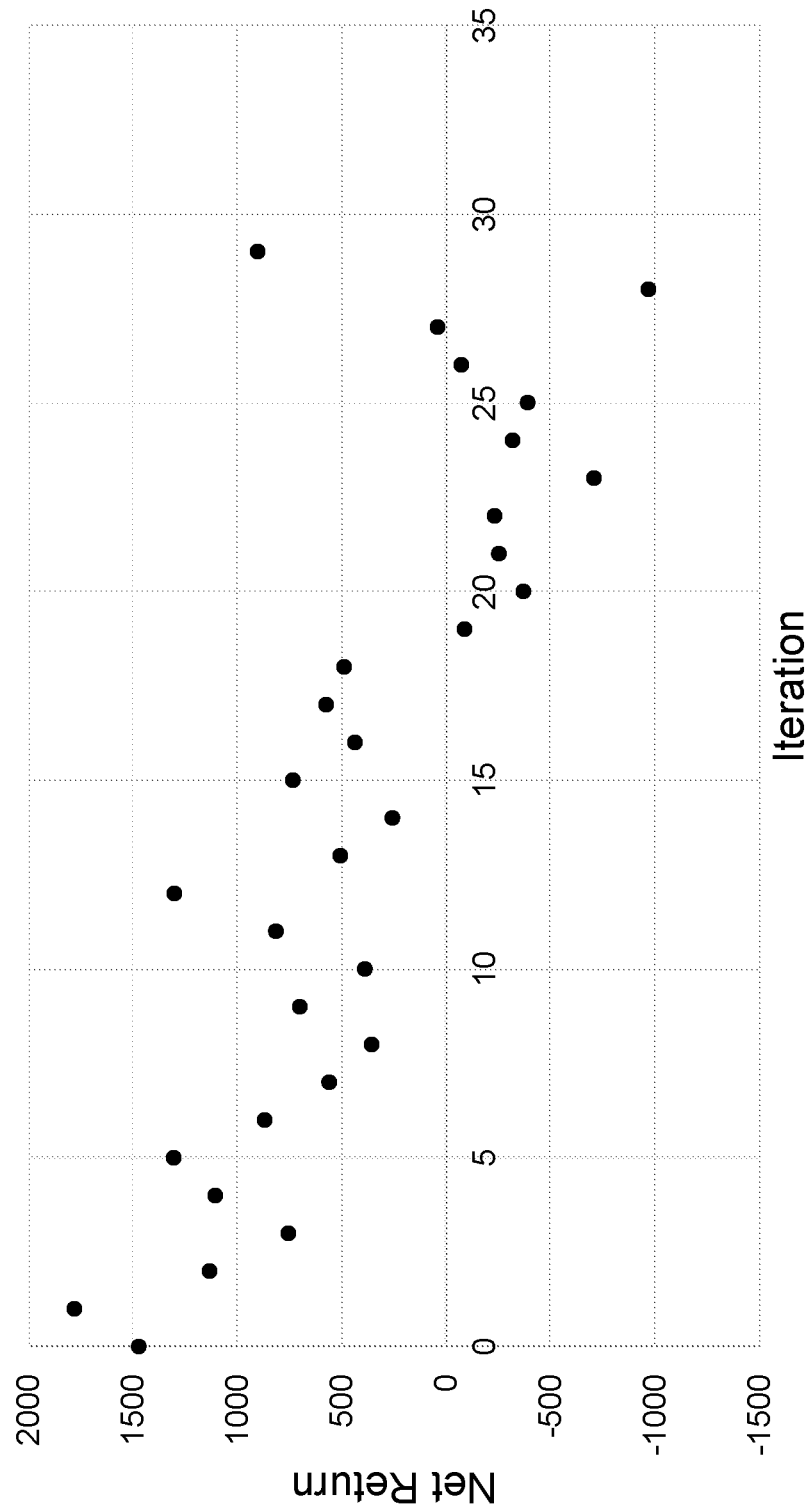
FIG. 11 illustrates results of end trials for one run according to some embodiments of the present disclosure.

Described below are results demonstrating the superior adversarial strategies developed by the invention described herein. The table in FIG. 10 summarizes the parameters used for the preferred embodiment, which consists of 23 parallel runs with the multi-population approach for synchronizing adversarial populations. The preferred embodiment performs 1000 "checkpoint trials" at the end of each iteration, and this also allows one to quantify the improvement made by each of the 30 iterations. A representative example of the results of one of the good runs (specifically run #2, with 37 hidden nodes) of the preferred embodiment are plotted in FIG. 11. In the beginning iterations of the run, it is easy for the approximate best response solver to find a strategy that resoundingly defeats the individuals in the existing adversarial population. However, the resulting policy improvement makes it more and more difficult to find superior policies. After the 19th iteration, the net return falls below zero as the solver temporarily loses its ability to find solutions that achieve more wins than losses against these highly-developed adversaries. If these inferior strategies were added to the adversarial population, the quality of the population would actually begin to decrease. This is where the "checkpoint trials" feature comes into play. Whenever the net return is below zero, the results of the iteration are discarded. Moreover, in the preferred embodiment, the evolving population is re-initialized with random neural network weight parameters so that more promising strategies can be explored. After discarding the results of several failed iterations, this run finally does find a very good improvement in the final iteration.

At the end of the empirical game theoretic analysis process, there are 230 models that can be selected from the adversarial population. However, the final result of the invention is a single policy, or a mixed strategy consisting of a set of policies together with a sampling distribution. For example, in the case of an autonomous vehicle, the system embedded in the vehicle selects from a set of strategies according to a probability distribution. If a decision to be made is whether to turn right or left to avoid colliding with an object, a random number can be generated such that if the number is greater that a predetermined threshold, the vehicle is caused to turn left, otherwise the vehicle turns right. The rationale for making such a decision randomly in adversarial scenarios is that unpredictability limits the opponent's ability to respond effectively. The classic example is the "rock-paper-scissors" game. The optimal strategy is to select one of the three randomly, with equal probability. If someone were to select any of the three options deterministically instead, the opponent would eventually figure that out and beat them every time from then on.

In the preferred embodiment, only the final model from each of the 21 runs that did not crash is considered. The results from each run are listed in the table of FIG. 12. The third column lists the averaged score resulting from the end trials of the final iteration. Run 9 was selected as the final result to return, because it has the highest averaged score in this column. The next column provides a validation metric obtained by testing the strategy against a scripted adversary. It is seen that the selected model achieves an 89.5% win rate against this baseline opponent. The last column also underscores the importance of the unique approach of the present invention that involves performing multiple runs. Less than half of the runs achieve a high win rate, even with the multi-population approach that synchronizes the adversarial population across all runs. Without performing synchronization, only around 10% of the runs are successful.

Figure 13:
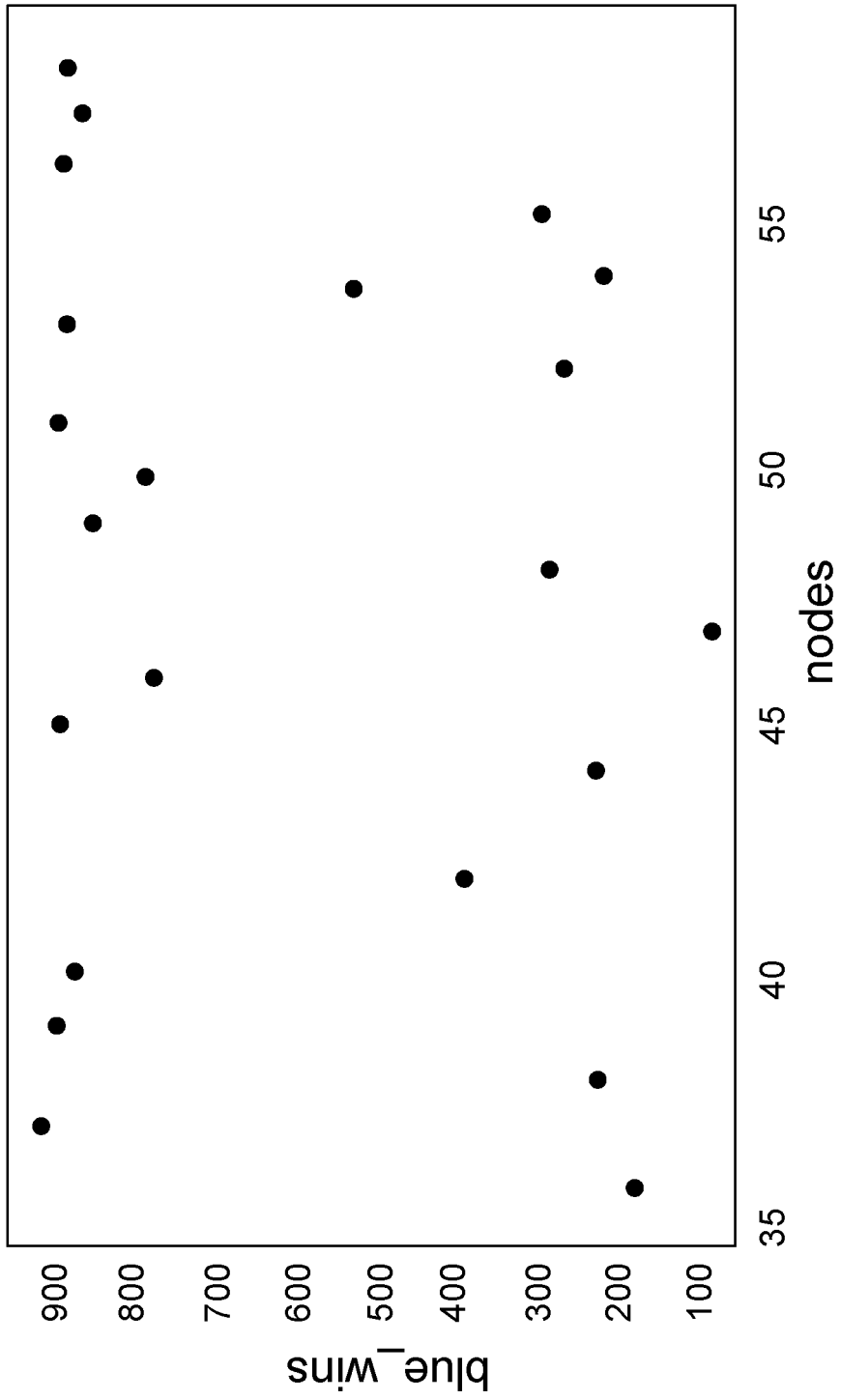
FIG. 13 illustrates results of a generalizable best response tournament according to some embodiments of the present disclosure.

Now, the results obtained using the alternative "generalizable best response" approach for tournament-based selection are described. FIG. 13 plots the win rate vs afsim_scripted_policy on the y-axis, and the number of nodes (an identifier for the run) on the x-axis. The highest performer is taken—in this case, the run with id 2 and 37 nodes. This strategy achieves optimal performance against afsim_scripted_policy (91.2%). It also achieves good results against other opponents. The more direct approach of computing an approximate best response to afsim_scripted_policy fails to generalize, and exhibits very poor performance against other adversaries.

The table in FIG. 14 contains results from an alternate embodiment that was trained without synchronizing the adversarial population across the different runs. In this case, only one of the runs achieved good performance against afsim_scripted_policy. By selecting this particular run, an approximate best response to afsim_scripted_policy (89.9% win rate) that also exhibits remarkable generalizability was achieved. Because this approach performs well against most opponents and also performs particularly well against the afsim_scripted_policy opponent that was used for evaluation, it is referred to as a "generalizable best response" model. In the last row of the table, the generalizable best response model is compared in a head-to-head matchup with an opponent that was trained directly against afsim_scripted_policy, which is referred to as a "simple best response" model. This simple best response opponent also achieves a similarly high win rate against afsim_scripted_policy, but is resoundingly defeated by the new generalizable best response model.

The present invention is different from typical single-agent autonomous systems, where the AI interacts with a stationary environment. Instead, in the present invention, the AI system learns how to control two adversaries in such a way that they exhibit realistic behavior of two opponents with zero-sum objective functions. The approach is based on empirical game theoretic analysis-a technique that has achieved state-of-the-art performance in various adversarial domains, such as real-time strategy games. However, it was found that in the particular application described herein, empirical game theoretic analysis in its original form produces inconsistent results, and only produces a highly effective policy around 10% to 50% of the time. By performing a large number of empirical game theoretic analyses, one is able to achieve much better and much more reliable results.

The key unexpected result of the invention described herein was the realization that different empirical game theoretic analysis runs produce results with vast diversity in quality, even if the only difference is that they each started with a different random initialization. Application of the technique according to embodiments of the present disclosure has been used to produce good results with an arbitrarily high level of confidence, limited only by the number of random starts that can be performed with available computing resources. In contrast, EGTA methods described in the prior art, which do not perform multiple random starts, produce good results only a small fraction of the time, where "good results" are defined as achieving more wins than losses against a scripted baseline adversary in a symmetric zero-sum game.

There are three major uses for this game-theoretic analysis system that learns realistic strategies for two adversarial forces. First, the strategy for one of the forces can be used to provide autonomous control of platforms (e.g., autonomous maneuvering and/or weapon firing of unmanned aircraft, unmanned submarines, unmanned land vehicles) in real-world engagements, or to suggest appropriate courses of action using decision analysis. Decision analysis is the overall process of modeling a decision making scenario and determining the most beneficial course of action. The invention described herein pertains to adversarial decision making scenarios in which there are two decision makers with conflicting interests. For example, in an air engagement scenario, one pilot, or other military officer, must learn how to defeat the enemy forces, and the adversary has the opposite objective. Thus, the present invention is used as a decision making agent that selects the most appropriate course of action in an adversarial scenario. The decision making process is based on the assumption that the opponent will make decisions that are designed to prevent the agent from succeeding. Second, the strategy for the other force can be used to control adversary platforms (e.g., during training exercises). Third, the two strategies can be used together to predict the likely trajectory and outcome of a given scenario. This is similar to the practice known as wargaming, where possible strategies for both sides are considered by human military analysts instead of an automated system. The trajectory of the scenario is equivalent to the trajectories of all platforms (e.g., vehicles) in the scenario, unless there are other objects in the scenario that also have state variables such as position or orientation.

To predict vehicle/scenario trajectories after training is complete for a mission analytics use case, first, the simulated environment sends observations of all the vehicles on each team to the final trained model/checkpoint. Then, the final trained model/checkpoint produces an action for each of the vehicles, and these actions are sent back to the simulated environment. This process of sending observations and actions to and from the trained model/checkpoint continues until the end of the episode. The episode ends after some maximum number of time steps have elapsed, or when some other event occurs, such as destruction of a vehicle. The observations and actions of all the vehicles in the scenario for the entire episode constitute a "trajectory" that can either be saved to the disk in raw form as a table or used to render a video depicting how the different vehicles are expected to maneuver if they are controlled by rational adversaries.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

The invention claimed is:

1. A system for performing a simulated vehicle control task based on adversarial decision analysis, the system comprising:
one or more processors and a non-transitory computer-readable medium having executable instructions encoded thereon such that when executed, the one or more processors perform operations of:
performing a plurality of empirical game theoretic analyses between an evolving population of neural network strategies and an adversary population of neural network strategies, wherein each empirical game theoretic analysis comprises:
using a neuroevolution procedure, performing a fitness-based selection of a strategy in the evolving population of neural network strategies that out-performs the adversary population of neural network strategies; and
using an empirical game theory procedure, iteratively running the neuroevolution procedure and adding the selected strategy to the adversary population of neural network strategies with each iteration,
wherein addition of the selected strategy to the adversary population of neural network strategies results in monotonic strategy improvement with each iteration;
following the plurality of empirical game theoretic analyses, selecting a final strategy for the evolving population of neural network strategies and the adversary population of neural network strategies using a tournament selection procedure;
using the final strategy, training a neural network; and
using the trained neural network to perform a simulated vehicle control task.

2. The system as set forth in claim 1, wherein the trained neural network is used to produce a simulated conflict scenario amongst vehicles, wherein the simulated conflict scenario is a graphical representation comprising a course of action for each vehicle of the conflict scenario.

3. The system as set forth in claim 1, wherein the one or more processors further perform an operation of controlling maneuvering of one or more autonomous vehicles according to the simulated vehicle control task.

4. The system as set forth in claim 2, wherein the one or more processors further perform an operation of predicting a trajectory of each of the vehicles using both the final strategy for the evolving population of neural network strategies and the final strategy for the adversary population of neural network strategies.

5. The system as set forth in claim 1, wherein the tournament selection procedure comprises:
evaluating each selected strategy from each iteration of the empirical game theory procedure against selected strategies from all other iterations;
producing a fitness matrix from the evaluation;
using a Nash solver to find a distribution for a symmetric zero-sum strategic form game defined by the fitness matrix; and
outputting a mixed strategy comprising a set of strategies with a sampling distribution.

6. The system as set forth in claim 1, wherein the tournament selection procedure comprises:
evaluating each selected strategy against a pre-existing adversary strategy to obtain a set of response quality metric results; and
selecting the final strategy according to the set of response quality metric results.

7. The system as set forth in claim 1, wherein the one or more processors further perform operations of:
evaluating the selected strategy from each iteration of the empirical game theory procedure against randomly sampled strategies from the adversary population of neural network strategies; and
discarding the selected strategy if it fails to result in improvement of the adversarial population of neural network strategies.

8. The system as set forth in claim 1, wherein the evolving population of neural network strategies is re-initialized with random neural network weight parameters in each empirical game theoretic analysis.

9. A computer implemented method for performing a simulated vehicle control task based on adversarial decision analysis, the method comprising an act of:
causing one or more processors to execute instructions encoded on a non-transitory computer-readable medium, such that upon execution, the one or more processors perform operations of:
performing a plurality of empirical game theoretic analyses between an evolving population of neural network strategies and an adversary population of neural network strategies, wherein each empirical game theoretic analysis comprises:
using a neuroevolution procedure, performing a fitness-based selection of a strategy in the evolving population of neural network strategies that out-performs the adversary population of neural network strategies; and
using an empirical game theory procedure, iteratively running the neuroevolution procedure and adding the selected strategy to the adversary population of neural network strategies with each iteration,
wherein addition of the selected strategy to the adversary population of neural network strategies results in monotonic strategy improvement with each iteration;
following the plurality of empirical game theoretic analyses, selecting a final strategy for the evolving population of neural network strategies and the adversary population of neural network strategies using a tournament selection procedure;
using the final strategy, training a neural network; and
using the trained neural network to perform a simulated vehicle control task.

10. The method as set forth in claim 9, further comprising an operation of using the trained neural network to produce a simulated conflict scenario amongst vehicles, wherein the simulated conflict scenario is a graphical representation comprising a course of action for each vehicle of the conflict scenario.

11. The method as set forth in claim 9, further comprising an operation of controlling maneuvering of one or more autonomous vehicles according to the simulated vehicle control task.

12. The method as set forth in claim 10, wherein the one or more processors further perform an operation of predicting a trajectory of each of the vehicles using both the final strategy for the evolving population of neural network strategies and the final strategy for the adversary population of neural network strategies.

13. The method as set forth in claim 9, wherein the tournament selection procedure comprises:
evaluating each selected strategy from each iteration of the empirical game theory procedure against selected strategies from all other iterations;
producing a fitness matrix from the evaluation;
using a Nash solver to find a distribution for a symmetric zero-sum strategic form game defined by the fitness matrix; and
outputting a mixed strategy comprising a set of strategies with a sampling distribution.

14. The method as set forth in claim 9, wherein the tournament selection procedure comprises:
evaluating each selected strategy against a pre-existing adversary strategy to obtain a set of response quality metric results; and
the final strategy according to the set of response quality metric results.

15. The method as set forth in claim 9, wherein the one or more processors further perform operations of:
evaluating the selected strategy from each iteration of the empirical game theory procedure against randomly sampled strategies from the adversary population of neural network strategies; and
discarding the selected strategy if it fails to result in improvement of the adversarial population of neural network strategies.

16. The method as set forth in claim 9, wherein the evolving population of neural network strategies is re-initialized with random neural network weight parameters in each empirical game theoretic analysis.

17. A computer program product for performing a simulated vehicle control task based on adversarial decision analysis, the computer program product comprising:
computer-readable instructions stored on a non-transitory computer-readable medium that are executable by a computer having one or more processors for causing the processor to perform operations of:
performing a plurality of empirical game theoretic analyses between an evolving population of neural network strategies and an adversary population of neural network strategies, wherein each empirical game theoretic analysis comprises:
using a neuroevolution procedure, performing a fitness-based selection of a strategy in the evolving population of neural network strategies that outperforms the adversary population of neural network strategies; and
using an empirical game theory procedure, iteratively running the neuroevolution procedure and adding the selected strategy to the adversary population of neural network strategies with each iteration,
wherein addition of the selected strategy to the adversary population of neural network strategies results in monotonic strategy improvement with each iteration;
following the plurality of empirical game theoretic analyses, selecting a final strategy for the evolving population of neural network strategies and the adversary population of neural network strategies using a tournament selection procedure;
using the final strategy, training a neural network; and
using the trained neural network to perform a simulated vehicle control task.

18. The computer program product as set forth in claim 17, further comprising instructions for causing the one or more processors to further perform an operation of predicting a trajectory of each vehicle in the vehicle simulation task using both the final strategy for the evolving population of neural network strategies and the final strategy for the adversary population of neural network strategies.

19. The computer program product as set forth in claim 17, wherein the tournament selection procedure comprises:
evaluating each selected strategy from each iteration of the empirical game theory procedure against selected strategies from all other iterations;
producing a fitness matrix from the evaluation;
using a Nash solver to find a distribution for a symmetric zero-sum strategic form game defined by the fitness matrix; and
outputting a mixed strategy comprising a set of strategies with a sampling distribution.

20. The computer program product as set forth in claim 17, wherein the tournament selection procedure comprises:
evaluating each selected strategy against a pre-existing adversary strategy to obtain a set of response quality metric results; and
selecting the final strategy according to the set of response quality metric results.

21. The computer program product as set forth in claim 17, further comprising instructions for causing the one or more processors to further performs of:
evaluating the selected strategy from each iteration of the empirical game theory procedure against randomly sampled strategies from the adversary population of neural network strategies; and
discarding the selected strategy if it fails to result in improvement of the adversarial population of neural network strategies.

22. The computer program product as set forth in claim 17, wherein the evolving population of neural network strategies is re-initialized with random neural network weight parameters in each empirical game theoretic analysis.

* * * * *